United States Patent
Wang et al.

(10) Patent No.: US 10,699,499 B2
(45) Date of Patent: *Jun. 30, 2020

(54) SYSTEM AND METHOD FOR OPERATIONAL PHASE DETECTION

(71) Applicant: THE BOEING COMPANY, Chicago, IL (US)

(72) Inventors: Changzhou Wang, Bellevue, WA (US); Jun Yuan, Sammamish, WA (US); Brian K. Predmore, Kent, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/006,044

(22) Filed: Jun. 12, 2018

(65) Prior Publication Data
US 2018/0293820 A1 Oct. 11, 2018

Related U.S. Application Data

(63) Continuation of application No. 15/157,892, filed on May 18, 2016, now Pat. No. 10,019,855.

(51) Int. Cl.
*G07C 5/08* (2006.01)
*B64D 43/02* (2006.01)
(Continued)

(52) U.S. Cl.
CPC .......... *G07C 5/0841* (2013.01); *B64D 43/02* (2013.01); *B64D 45/0005* (2013.01); *G05B 23/021* (2013.01); *G05B 23/0245* (2013.01)

(58) Field of Classification Search
None
See application file for complete search history.

(56) References Cited

U.S. PATENT DOCUMENTS 5,208,590 A 5/1993 Pitts
5,479,346 A 12/1995 Lecomte et al.
(Continued)

FOREIGN PATENT DOCUMENTS

EP 2757360 A2 7/2014

OTHER PUBLICATIONS

Extended European Search Report for Application No. 17167409.6 dated Sep. 22, 2017, 9 pgs.
(Continued)

*Primary Examiner* — Abdhesh K Jha
(74) *Attorney, Agent, or Firm* — Moore IP Law

(57) ABSTRACT

A method includes obtaining data associated with operation of an aircraft and determining a first operational phase of the aircraft based on the data. The method includes identifying a candidate operational phase transition from the first operational phase to a candidate operational phase based on a first portion of the data satisfying a first condition associated with the candidate operational phase, the first portion of the data corresponding to a first time. The method includes evaluating a second portion of the data based on a second condition associated with the candidate operational phase, the second portion of the data corresponding to a second time that is subsequent to the first time. The method further includes, based on the second condition being satisfied, generating an operational phase transition indication that indicates an occurrence of an operational phase transition to the candidate operational phase at the first time.

20 Claims, 11 Drawing Sheets

(51) Int. Cl.
*B64D 45/00* (2006.01)
*G05B 23/02* (2006.01)

(56) References Cited

U.S. PATENT DOCUMENTS

| | | |
|---|---|---|
| 7,109,937 B2 | 9/2006 | Iluz et al. |
| 8,217,807 B1 | 7/2012 | Carrico |
| 8,493,240 B1 | 7/2013 | Carrico |
| 9,309,009 B1 | 4/2016 | Poux et al. |
| 9,550,578 B2 | 1/2017 | McCullough et al. |
| 2012/0158220 A1 | 6/2012 | Accardo et al. |
| 2012/0277936 A1 | 11/2012 | Kumar MN et al. |
| 2014/0200748 A1 | 7/2014 | Porez et al. |
| 2016/0244186 A1 | 8/2016 | Brown |

OTHER PUBLICATIONS

Communication pursuant to Article 94(3) EPC for Application No. 17171678.0, dated Apr. 16, 2020, 4 pgs.

FIG. 6

SYSTEM AND METHOD FOR OPERATIONAL PHASE DETECTION

CROSS-REFERENCE TO RELATED APPLICATIONS

This application claims priority from and is a continuation of U.S. patent application Ser. No. 15/157,892, entitled "SYSTEM AND METHOD FOR OPERATIONAL PHASE DETECTION," filed May 18, 2016, now U.S. Pat. No. 10,019,855, the entire contents of which are expressly incorporated herein by reference.

FIELD OF THE DISCLOSURE

The present disclosure is generally related to operational phase and event detection.

BACKGROUND

Improvements in technology have led to an increasing number of sensors on board vehicles, such as aircraft, automobiles, ships, drones, rockets, spacecraft, and so forth. Data recorded from these sensors may be used to analyze vehicle operations for different purposes, such as safety diagnosis, reliability analysis, operation cost reduction, and flight testing. One aspect of analyzing vehicle operations is operational phase detection. For example, in the context of an airplane, operational phases may include taxi, take-off roll, climb, cruise, descent, and landing. Each operational phase may have different safety requirements and testing parameters.

The operational phases may be defined by definition logic. By processing the data recorded from the sensors according to the definition logic, operational phases and transitions of the vehicle may be detected. The definition logic may be changed or adjusted from time to time. For example, definition logic may be changed or adjusted for new vehicles, when a vehicle component is replaced or updated, or as a vehicle component ages. However, the definition logic may not be easily changed or adjusted and checking the accuracy of any change or adjustment may be time consuming, computationally intensive, and may require additional testing. For example, changing a single parameter of the definition logic may require processing (e.g., reprocessing) all or a substantial portion of the data recorded from the sensors to generate updated operational phases and updated transitions of the vehicle.

SUMMARY

In a particular implementation, a method for monitoring vehicle operation using operational data acquired during operation of a vehicle includes obtaining, at a processor, data associated with operation of the vehicle and determining, by the processor, a first operational phase of the vehicle based on the data. The method includes identifying, by the processor, a candidate operational phase transition from the first operational phase to a candidate operational phase based on a first portion of the data satisfying a first condition associated with the candidate operational phase, the first portion of the data associated with a first time. The method includes after identifying the candidate operational phase transition, evaluating, by the processor, a second portion of the data based on a second condition associated with the candidate operational phase, the second portion of the data associated with a second time that is subsequent to the first time. The method further includes, based on the second condition being satisfied, generating, by the processor, an operational phase transition indication associated with the first time and that indicates an operational phase transition from the first operational phase to the candidate operational phase.

In some implementations, a vehicle includes a plurality of sensors that are configured to generate sensor data during operation of the vehicle and a processor configured to receive the sensor data. The processor is further configured to identify a candidate operational phase transition from a first operational phase of the vehicle to a candidate operational phase of the vehicle based on a determination that a first value of a first parameter of the data satisfies a first condition associated with the candidate operational phase, the first value associated with a first time. The processor is configured to evaluate, for a second time that is subsequent to the first time, values of a second parameter of the data based on a second condition associated with the candidate operational phase. The processor is further configured to, based on a determination that the second condition is satisfied, generate an operational phase transition output that indicates an operational phase transition associated with the first time.

In some implementations, a non-transitory computer-readable medium stores instructions that, when executed by a processor, cause the processor to perform operations including obtaining data associated with operation of a vehicle and identifying a set of operational phase transition conditions based on rules defining detection of operational phase transitions associated with the vehicle. The operations further include binning the data to generate data segments, each data segment corresponding to a set of data values bounded by at least one operational phase transition condition, detecting an operational phase transition from a first operational phase to a candidate operational phase based on the data segments, and generating an operational phase transition indication that indicates the operational phase transition.

The features, functions, and advantages that have been described can be achieved independently in various implementations or may be combined in yet other implementations, further details of which are disclosed with reference to the following description and drawings.

BRIEF DESCRIPTION OF THE DRAWINGS

FIG. 6 is an example of a graphical user interface for operational phase detection;

DETAILED DESCRIPTION

Figure 1:
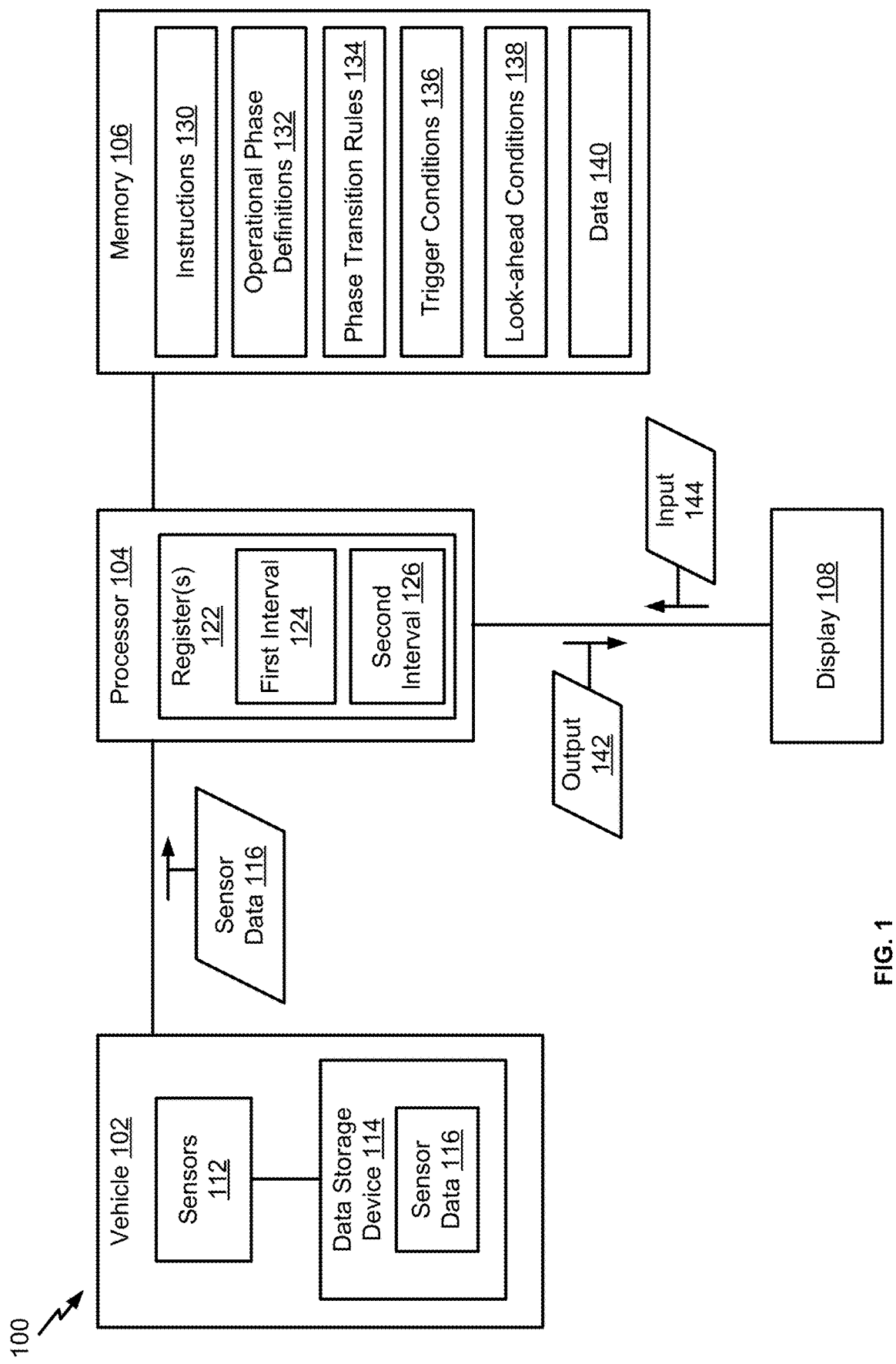
FIG. 1 is a block diagram that illustrates an example of a system for operational phase detection.

Implementations disclosed herein enable improved vehicle operational phase detection and event detection. In particular, one or more systems described herein include a vehicle including a plurality of sensors, a processor, and a memory. The plurality of sensors may obtain sensor data during operation of the vehicle. The sensor data may be stored in the memory and may be accessible to the processor. The processor may process the sensor data to identify one or more operational phases of the vehicle, one or more operational phase transitions of the vehicle, one or more events of the vehicle, or a combination thereof.

To illustrate, the processor may identify a first operational phase of the vehicle. The processor may then identify one or more potential operational phases. For example, the processor may identify that from a climb phase, a vehicle may transition into a cruise phase, into a maneuver phase, or into a descent phase. The processor may identify a first operational phase transition (or a candidate operational phase transition) from the first operational phase to a particular operational phase of the one or more operational phases based on the data. For example, the processor may identify the first operational phase transition based on a determination that a first portion of the sensor data satisfies a trigger condition (e.g., a first condition). The processor may evaluate a second portion of the sensor data based on a second condition. The second condition may be a look-ahead condition based on a parameter value at a time in the future from when the trigger condition was satisfied. In some implementations, the look-ahead condition may be satisfied when at least a portion of parameter values during a look-ahead period satisfy the second condition. The processor may generate the first operational phase transition in response to the first condition and second condition being satisfied.

The processor may determine that the first condition and the second condition are satisfied based on segmenting the sensor data into intervals of timestamps. For example, for a parameter, the processor may generate one or more intervals based on values of the parameter that satisfy one or more conditions (e.g., trigger conditions, look-ahead conditions, or both). Each interval may include sequential values (e.g., timestamps) and may represent a period of time. The processor may identify the one or more operational phase transitions using the segmented sensor data (e.g., the one or more intervals). In some implementations, the sensor data may be segmented prior to identifying the first operational phase transition. The processor may generate an output indicating the one or more phase transitions of the vehicle.

Additionally, the processor may identify one or more events (e.g., engine start, take-off, landing gear retraction, touchdown, etc.) of the vehicle based on event conditions and the operational phases of the vehicle. For example, the processor may identify an event based on the segmented data satisfying a particular event condition during a particular operational phase of the vehicle. The output of the processor may further indicate the one or more events of the vehicle.

The system may also include a display that is configured to receive the output from the processor. The display may include or correspond to a graphical user interface ("GUI"). The GUI may display a graphical representation of the operational phases of the vehicle based on one or more outputs from the processor. The graphical representation may include a chronological ordering of a plurality of segments (e.g., occurrences of operational phases). The GUI may be configured to adjust the operational phases and the conditions, such as trigger conditions, look-ahead conditions, and event conditions. The GUI may automatically update the graphical representation of the operational phases of the vehicle in response to adjusting the operational phases and the conditions (e.g., operational phase detection logic). Thus, the system may enable adjusting and testing of the operational phase detection logic.

FIG. 1 illustrates an example of a system 100 that includes a vehicle 102, a processor 104, and a memory 106. The system 100 may also include a display 108. In a particular implementation of the system 100, the vehicle 102 may include or correspond to an aircraft, an automobile, a train, a motorcycle, a bus, a ship or boat, a rocket, a spacecraft, an autonomous vehicle, or another vehicle, as illustrative, non-limiting examples. Although the system 100 is illustrated as including the vehicle 102, in other implementations, the system 100 may include a machine, a factory, a building, or a component thereof.

The vehicle 102 includes a plurality of sensors 112 onboard the vehicle 102. The vehicle 102 may also include a data storage device 114. The plurality of sensors 112 may be configured to generate sensor data 116 during operation of the vehicle 102. The plurality of sensors 112 may include multiple types of sensors. For example, the multiple types of sensors may include a speed sensor, an altitude sensor, a pressure sensor, a control surface sensor (e.g., a flap position indicator), a landing gear position indicator, a fuel flow rate sensor, a powerplant sensor (e.g., an engine revolutions-per-minute (RPM) sensor), or a combination thereof, as illustrative, non-limiting examples.

The sensor data 116 may include values of parameters. For example, the sensor data may 116 include speed values for a speed parameter, altitude values for an altitude parameter, or a combination thereof, as illustrative, non-limiting examples. As another example, for a landing gear position parameter, the values may include or correspond to state data that indicates a state of the parameter, such as landing gear deployed or retracted. In some implementations, the sensor data 116 generated from one or more of the plurality of sensors 112 may be timestamped. For example, the speed sensor may assign each speed value a corresponding time, such as t0, t1, t2, etc. In other implementations, at least a portion of the sensor data 116 may not be timestamped when generated by the plurality of sensors 112. Sensor data 116 that does not have a timestamp may be timestamped or synchronized by the processor 104 or by another component, such as a processor or controller of the vehicle 102. To illustrate, the processor 104 may generate time data for or assign timestamps to at least a portion of the sensor data 116.

The data storage device 114 may include or correspond to a volatile memory, a non-volatile memory, or a combination thereof. The data storage device 114 may be configured to store data. For example, the data storage device 114 may store the sensor data 116. In other implementations, the data storage device 114 may store other data, such as data based on or including the sensor data 116. The other data may include timestamps, time data, estimated sensor values, a subset of the sensor data 116, or a combination thereof.

The processor 104 may be configured to obtain (e.g., receive) the sensor data 116 from the vehicle 102. The processor 104 may receive the sensor data 116 via a network connection, or the processor 104 may be coupled to an interface of the vehicle 102. In other implementations, the data storage device 114 may be removed from the vehicle 102 and coupled to the processor 104, or the sensor data 116 may be copied and transferred to the processor 104. In some implementations, the processor 104 may be configured to receive other data from the vehicle 102, such as data based on the sensor data 116. The other data may include timestamps, time data, estimated sensor values, a subset of the sensor data 116, or a combination thereof. Although the processor 104 is illustrated as being separate from the vehicle 102, in other implementations, the processor 104 may be onboard the vehicle 102.

Additionally or alternatively, the processor 104 may remove values or add values to a portion of the sensor data 116 (e.g., particular sensor data corresponding to a particular sensor of the plurality of sensors 112) to synchronize the sensor data 116 or to smooth out the sensor data 116. For example, the processor 104 may remove values when sensors have different sampling rates to synchronize a faster sampling rate with a slower sampling rate. As another example, the processor 104 may add estimated values to smooth out the sensor data 116 when a sensor has a slow sampling rate, when the values of the sensor data 116 have large fluctuations, or both. Further, the processor 104 may be configured to correct errors in the sensor data 116. For example, the processor 104 may assign a null value (e.g., 0 or 9999) to a parameter value when the parameter value is determined to be incorrect or unreliable. For example, the processor 104 may assign the null value to a parameter value generated by a malfunctioning sensor or to a value that is determined to be outside of an operating envelope or an expected range of values, as illustrative, non-limiting examples.

The processor 104 may be configured to perform parameter segmentation (e.g., data binning) on the sensor data 116 to generate segmented data. The segmented data (e.g., data segments) may include one or more intervals of time values or timestamps. The processor 104 may, for each parameter, determine intervals of time values or timestamps where corresponding values of the parameter satisfy various conditions, as described with reference to FIG. 2. The processor 104 may be configured to determine (or identify) operational phases, operational phase transitions, events, or a combination thereof, of the vehicle 102 based on the segmented data. In some implementations, the processor 104 may include one or more registers 122 to store the segmented data. In other implementations, the segmented data may be stored at the memory 106 and may be included in the data 140.

The processor 104 may be configured to generate an output 142 and to send the output 142 to the display 108. The output 142 may indicate one or more operational phases, one or more operational phase transitions, one or more events, or a combination thereof. The processor 104 may be configured to receive an input 144 from the display 108. The processor 104 may update the output 142 or send a second output to the display 108 based on the input 144.

The processor 104 is coupled to the memory 106. The memory 106 may include or correspond to a volatile memory, a non-volatile memory, or a combination thereof. In a particular implementation, the memory 106 may include or correspond to a storage device. The memory 106 may be configured to store instructions and data. For example, the memory 106 may store instructions 130 that are executable by the processor 104 to perform various operations of operational phase detection. The memory 106 may store operational phase definitions 132, phase transition rules 134, trigger conditions 136, look-ahead conditions 138, and data 140. Although the memory 106 is illustrated as being separate from the vehicle 102, in other implementations, the memory 106 may be onboard the vehicle 102.

The operational phase definitions 132 may specify various operational phases of the vehicle 102. The operational phase definitions 132 may correspond to the vehicle 102 or may correspond to a type of the vehicle. For example, the operational phases may correspond to a single specific passenger aircraft, or the operational phases may correspond to all passenger aircraft of a particular model or fleet. Additionally, the operational phase definitions 132 may specify multiple sets of operational phases. For example, the operational phase definitions 132 may specify a first set of operational phases that correspond to a first particular vehicle (e.g., the vehicle 102) and a second set of operational phases that correspond to a second particular vehicle (e.g., another vehicle of the same type or a different type). Additionally or alternatively, the operational phase definitions 132 may specify operational phases for different purposes. For example, a first set of operational phases may correspond to efficiency calculation purposes and a second set of operational phases may correspond to maintenance tracking purposes. The operational phase definitions 132 and the operational phases are described further with reference to FIG. 4.

The phase transition rules 134 may include a plurality of rules that indicate allowed operational phase transitions. For example, a first phase transition rule of the phase transition rules 134 may indicate that a taxi out phase may transition into a take-off roll phase, and a second phase transition rule may indicate that a cruise phase may transition into a plurality of operational phases, as illustrative, non-limiting examples. The phase transition rules 134 and allowed operational phase transitions are described further with reference to FIG. 4.

The trigger conditions 136 (e.g., first conditions) may define conditions that indicate when an operational phase transition (e.g., a candidate operational phase transition or a transition trigger) may have occurred. For example, the trigger conditions 136 may include Boolean conditions (e.g., a parameter greater than or equal to a threshold) that indicate candidate operational phase transitions. When a trigger condition is satisfied, an operational phase transition may have occurred. Occurrence of the operational phase transition is confirmed if another condition, such as a look-ahead condition, is also satisfied. In some implementations, the candidate operational phase transition may be indicated by satisfying two or more conditions, such as a trigger condition and an advanced trigger condition.

To illustrate, a first trigger condition may correspond to a parameter (e.g., ground speed) being greater than or equal to a threshold (e.g., 10 nautical miles per hour (knots)). A candidate operational phase transition may be indicated by satisfying the first trigger condition. As another illustration, a second trigger condition may correspond to a second parameter matching a second value or status, such as landing gear position equals down. A candidate operational phase transition may be indicated by satisfying the first trigger condition and the second trigger condition (e.g., an advanced trigger condition). As yet another illustration, a third trigger condition may correspond to a current operational phase status matching an operational phase condition (e.g., taxi out or landing). A candidate operational phase transition may be indicated by satisfying the first trigger condition, the second trigger condition, the third trigger condition, or a combination thereof.

In some implementations, one or more of the trigger conditions 136 may be associated with a delay (e.g., a time offset value). For example, a particular trigger condition may include a delay (e.g., a time offset value) that represents a minimum time between transitioning from the first operational phase to the candidate operational phase. To illustrate, the particular condition may be satisfied at the first time, but the operational phase transition to a subsequent operational phase may occur after the delay (e.g., 10 seconds, 100 seconds, etc. from a prior operational phase transition). In other implementations, the trigger conditions may not be associated with a delay. For example, the initial phase may immediately transition to the taxi out phase without a delay, such as at the first time.

In some implementations, one or more of the trigger conditions 136 may be triggered once. For example, during a particular operation of the vehicle 102, the vehicle may take-off once. Thus, when a particular trigger condition corresponding to the take-off roll phase is satisfied for a first time (e.g., at the first time), the processor 104 may cease to identify subsequent times at which the particular trigger condition corresponding to the take-off roll phase may be satisfied. Additionally or alternatively, one or more of the trigger conditions 136 may be triggered multiple times. For example, during operation of the vehicle 102, the vehicle 102 may perform multiple maneuvers. Thus, when a particular trigger condition corresponding to a maneuver phase is satisfied for a first time (e.g., at the first time), the processor 104 may continue to evaluate the sensor data 116 (e.g., parameter values subsequent to the first time) based on the particular trigger condition corresponding to the maneuver phase. In some implementations, the phase transition rules 134 may indicate a number of time in which of each of the trigger conditions 136 may be triggered.

The look-ahead conditions 138 may include or correspond to conditions that, if a trigger condition is satisfied, indicate that an operational phase transition (e.g., a candidate operational phase transition, a look-ahead trigger, or both) has occurred at the transition trigger (e.g., the first time). For example, the look-ahead conditions 138 may include one or more conditions that are satisfied at a second time or during a time period (e.g., a look-ahead period) after a trigger condition is satisfied at the first time. The look-ahead conditions 138 may include Boolean conditions (e.g., a parameter greater than or equal to a threshold). In some implementations, when the trigger condition is satisfied, the operational phase transition may be indicated by satisfying two or more conditions, such as a look-ahead condition and an advanced look-ahead condition.

In some implementations, a look-ahead condition may be satisfied based on values of a parameter satisfying one or more conditions during a look-ahead period. To illustrate, the particular look-ahead condition may be satisfied when values of a fuel flow rate parameter are within a first detection range (e.g., greater than or equal to 1.5 kilograms per second (kg/s) and less than or equal to 2.0 kg/s) for a look-ahead period. Additionally, a particular look-ahead condition may be satisfied based on values of a parameter remaining in a range of values (e.g., a detection range) for at least a portion of one or more look-ahead periods. For example, a look-ahead condition may be satisfied when values of a fuel flow rate parameter are greater than or equal to 1.5 kilograms per second (kg/s) and less than or equal to 2.0 kg/s for at least half of one or more look-ahead periods.

The look-ahead period may be fixed (e.g., the look-ahead period has a fixed length and starts after a transition trigger or an operational phase) or may be flexible (e.g., the look-ahead period includes a minimum look-ahead period length and a maximum look-ahead period length after a transition trigger or an operational phase). As an illustrative, non-limiting example, a fixed look-ahead period may be 15 minutes and may begin after a trigger condition is satisfied. As another illustrative, non-limiting example, a fixed look-ahead period may be five minutes, and the look-ahead period may begin two minutes after a trigger condition is satisfied and may end seven minutes after the trigger condition is satisfied.

As an illustrative, non-limiting example, a flexible look-ahead period may have a minimum look-ahead period length of two minutes and a maximum look-ahead period length of five minutes. A look-ahead condition that includes a flexible look-ahead period may be satisfied if the look-ahead condition is satisfied for at least the minimum look-ahead period length. If the look-ahead condition is satisfied for the maximum look-ahead period length, the look-ahead condition may be satisfied. If the look-ahead condition is satisfied for the minimum look-ahead period length but is not satisfied for the maximum look-ahead period length, other conditions, such as an advanced look-ahead condition, may be used to determine if the look-ahead condition is satisfied. In some implementations, the advanced look-ahead condition may be evaluated for a time period between the minimum length and the maximum length. If the look-ahead condition is not satisfied for at least the minimum look-ahead period length, the look-ahead condition is not satisfied.

In some implementations, a look-ahead condition may be satisfied based on satisfying a condition for one or more sub-periods of a look-ahead period. The look-ahead period may include multiple sub-periods, such as six, thirty second sub-periods, as an illustrative, non-limiting example. To illustrate, the look-ahead condition may be satisfied when parameter values satisfy the condition during at least one sub-period.

In some implementations, each look-ahead condition 138 may have a corresponding priority. For example, a first look-ahead condition may have a higher priority than a second look-ahead condition. In this example, after a trigger condition associated with the first and second look-ahead condition is satisfied, the first look-ahead condition may be evaluated first, and an operational phase transition (or a candidate operational phase transition) may be indicated if the first look-ahead condition is satisfied. If the first look-ahead condition is not satisfied, the second look-ahead condition may be evaluated. An operational phase transition (or a candidate phase transition) may be indicated if the second look-ahead condition is satisfied. In other implementations, if the second look-ahead condition is satisfied, a third look-ahead condition may be evaluated, and an operational phase transition (or a candidate operational phase transition) may be indicated when the second look-ahead condition and the third look-ahead condition are satisfied.

If the second look-ahead condition is not satisfied, an operational phase transition may not be indicated, and other trigger conditions and look-ahead conditions associated with other operational phase transitions may be evaluated. In other implementations, if the second look-ahead condition is not satisfied, other look-ahead conditions associated with the satisfied trigger condition may be evaluated, and an operational phase transition may be indicated based on one or more of the other look-ahead conditions being satisfied. In some implementations, the first look-ahead condition, the second look-ahead condition, the third look-ahead condition, or a combination thereof, may be evaluated in parallel or in series.

In some implementations, the memory 106 may store event conditions to identify events (e.g., engine start, take-off, landing gear retraction, touchdown, etc.) associated with the vehicle 102 during operation. The event conditions may include or correspond to conditions associated with an operational phase, an operational phase transition (e.g., a start of a first operational phase, an end of a second operational phase, etc.), or both. For example, an engine start event may be identified based on a condition of a fuel flow rate parameter greater than zero occurring during a ground phase (e.g., the initial phase, the taxi out phase, or the take-off roll phase).

The data 140 stored in the memory 106 may include, correspond to, or be based on the sensor data 116. For example, the data 140 may include synchronized sensor data 116, error corrected sensor data 116, smoothed sensor data 116, or a combination thereof. The data 140 may be generated by the processor 104 based on the sensor data 116. For example, the processor 104 may receive the sensor data 116, including the altitude values of the altitude parameter, and may generate altitude rate of change values for a delta altitude parameter based on the sensor data 116. In other implementations, the data 140 may be generated by a component of the vehicle 102 or another device and transferred to the processor 104. In some implementations, the data 140 may include or correspond to the segmented data generated by the processor 104.

The display 108 may be coupled to the processor 104. The display 108 may be configured to receive the output 142 and may be configured to generate a graphical representation of one or more operational phases, operational phase transitions, events, or a combination thereof. For example, the graphical representation may include a chronological ordering of one or more operational phases associated with the vehicle 102 based on an identification of a number of operational phases. In some implementations, the display 108 may include or correspond to a GUI. The GUI may include features and tools to adjust the one or more of the operational phase definitions 132, the phase transition rules 134, the trigger conditions 136, the look-ahead conditions 138, the data 140, or a combination thereof, as described with reference to FIGS. 5-8. The GUI may be configured to receive a user input and to generate the input 144 based on the user input. The GUI may be configured to send the input 144 to the processor 104. The input 144 may enable the processor 104 to adjust or change one or more of the operational phase definitions 132, the phase transition rules 134, the trigger conditions 136, the look-ahead conditions 138, the data 140, or a combination thereof. Although the display 108 is illustrated as being separate from the vehicle 102, in other implementations, the display 108 may be onboard the vehicle 102.

The plurality of sensors 112 of the vehicle 102 may generate sensor data 116 during the operation of the vehicle 102. The sensor data 116 may be stored on the data storage device 114. The data storage device 114 may begin storing the sensor data 116 in response to a particular event (e.g., power on) or in response to user input. During or after operation of the vehicle 102, the sensor data 116 may be transferred to the processor 104. The processor 104 may process the sensor data 116 to generate the data 140. For example, different parameters of the sensor data 116 may have different sampling rates, and the processor 104 may add parameter values, remove parameter values, or both, to adjust the sampling rates. As another example, the processor 104 may assign a null value to a value of the parameter when a sensor outputted an error. The processor 104 may store the data 140 in the memory 106.

The processor 104 may process the data 140 to identify one or more operational phase transitions and to identify operational phases of the vehicle 102 during operation. The processor 104 may identify an initial operational phase. The initial operational phase may be a default phase, may be entered by a user, or may be determined based on trigger conditions 136, look-ahead conditions 138, or both.

The processor 104 may identify a first operational phase transition to a first operational phase based on the current operational phase (e.g., the initial phase), the operational phase definitions 132, the phase transition rules 134, the trigger conditions 136, the look-ahead conditions 138, or a combination thereof. For example, the processor 104 may identify the first operational phase transition from the initial phase to a taxi out phase. To identify the first operational phase transition, the processor 104 may evaluate the operational phase definitions 132, the phase transition rules 134, or both, to determine that the vehicle 102 may transition into the taxi out phase from the initial phase. The processor 104 may determine that a first portion of the data 140 satisfies a first trigger condition associated with the taxi out phase to identify a candidate operational phase transition. For example, the processor 104 may determine that a particular value of a first parameter (e.g., ground speed) of the data 140 satisfies the first trigger condition of ground speed greater than 10 knots at a first time. The processor 104 may identify a candidate operational phase transition (e.g., a first transition trigger) at the first time based on the particular value of the first parameter satisfying the first trigger condition.

After identifying the candidate operational phase transition, the processor 104 may evaluate the candidate operational phase transition to determine whether an operational phase transition occurred. For example, the processor 104 may determine that a second portion of the data 140 satisfies a first look-ahead condition at a second time subsequent to the first time. The first look-ahead condition may be associated with the first trigger condition, the taxi out phase, or both. In some implementations, the second time may correspond to a period of time (e.g., a look-ahead period). To illustrate, the processor 104 may determine that values of the first parameter (e.g., ground speed) of the data 140 satisfy the first look-ahead condition of ground speed greater than or equal to 50 knots during at least a portion of a look-ahead period. For example, the processor 104 may determine that the first look-ahead condition is satisfied when any sub-period (e.g., 30 seconds) of the look-ahead period (e.g., 10 or 15 minutes) satisfies the condition of ground speed greater than or equal to 50 knots.

The processor 104 may identify the first operational phase transition (e.g., a candidate phase transition) based on the data 140 satisfying the first trigger condition and the first look-ahead condition. The first operational phase transition may indicate a transition from the initial phase to the taxi out phase. The first operational phase transition may be associated with the first time.

In some implementations, the processor 104 performs data segmentation to identify the operational phase transitions. For example, the processor 104 may segment a portion of the data 140 corresponding to a parameter (e.g., a ground speed parameter) into one or more intervals of time values or timestamps based on one or more conditions (e.g., ground speed greater than 10 knots, ground speed greater than or equal to 50 knots, etc.). The processor 104 may generate a first interval 124 that corresponds to an interval of sequential timestamps that satisfies a first condition. For example, the sequential timestamps have corresponding parameter values that satisfy the first trigger condition (e.g., ground speed greater than 10 knots). The processor 104 may generate a second interval 126 that corresponds to an interval of sequential timestamps that satisfies a second condition. For example, the sequential timestamps have corresponding parameter values that satisfy the second condition (e.g., ground speed greater than or equal to 50 knots). The second condition may correspond to another trigger condition (e.g., associated with another operational phase) or to a look-ahead condition. The processor 104 may store the first interval 124 and the second interval 126 in one or more registers 122. Additionally or alternatively, the processor 104 may store the first interval 124 and the second interval 126 in the memory 106.

The processor 104 may determine an operational phase transition based on the intervals 124, 126. For example, a first value of the first interval 124 may indicate a transition trigger (e.g., a first time at which a trigger condition is satisfied) of the data 140, and the second interval 126 may indicate at which times a look-ahead condition is satisfied by the data 140. The processor 104 may identify the operational phase transition if the second interval 126 overlaps in time with at least a portion of a look-ahead period (e.g., a period of 10 minutes from the first value of the first interval 124). For example, the processor 104 may generate an interval corresponding to the look-ahead period based on the look-ahead condition and the first time. The processor 104 may determine that an overlap occurred by identifying that the second interval 126 intersects a portion of the look-ahead interval. The processor 104 may determine that no operational phase transition is associated with the first time based on determining that the second interval 126 does not overlap (e.g., intersect) with at least a portion of the look-ahead interval. By performing parameter segmentation, the processor 104 may identify multiple operational phase transitions based on the data segments, which are generated by evaluating the data once, rather than by evaluating the data (or a portion thereof) each time to identify a single operational phase transition.

In some implementations, the processor 104 may identify multiple operational phase transitions, such as a second operational phase transition, a third operational phase transition, a fourth operational phase transition (e.g., a candidate operational phase transition), etc. The processor 104 may identify the operational phase transitions sequentially or in parallel. As an illustrative, non-limiting example, the processor 104 may identify the second operational phase transition from the taxi-out phase to a take-off roll phase based on a second trigger condition and a second look-ahead condition, and may identify the third operational phase transition from the take-off roll phase to a climb phase based on a third trigger condition and a third look-ahead condition.

In some implementations, the processor 104 may identify a particular operational phase transition from multiple candidate operational phase transitions based on prioritizing the multiple candidate operational phase transitions. The processor 104 may identify one or more candidate operational phase transitions to one or more operational phases based on multiple trigger conditions of the trigger conditions 136. To illustrate, the processor 104 may identify the fourth operational phase transition from the climb phase to another operational phase. The phase transition rules 134 may indicate that from the climb phase, the vehicle 102 may transition into a cruise phase, a maneuver phase, or a decent phase. The processor 104 may identify candidate operational phase transitions for each possible operational phase (e.g., the cruise phase, the maneuver phase, and the decent phase) based on the multiple trigger conditions. The processor 104 may prioritize the candidate operational phase transitions to select an operational phase transition. For example, the processor 104 may prioritize the candidate operational phase transitions by earliest transition trigger time. As another example, the processor 104 may prioritize the candidate operational phase transitions based on the phase transition rules 134. To illustrate, the phase transition rules 134 may indicate that an operational phase transition (from the climb phase) to the cruise phase has a higher priority than an operational phase transition to a maneuver or descent phase. In some implementations, the processor 104 may evaluate the data 140 for an operational phase transition having a higher priority before evaluating an operational phase transition having a lower priority. If a higher priority operational phase transition is identified, the processor 104 may cease evaluating lower priority operational phase transitions.

Additionally, the processor 104 may identify one or more events based on the operational phases, the operational phase transitions, the segmented data (e.g., data segments), or a combination thereof. For example, the processor 104 may identify a first event (e.g., take-off) based on an operational phase and an operational phase transition. To illustrate, the processor 104 may identify the first event (e.g., take-off) based on a start of the initial climb phase, such as an operational phase transition from take-off roll to initial climb. The processor 104 may identify a second event based on an operational phase, an operational phase transition and the segmented data. For example, the processor 104 may identify an engine start event based on the initial phase, an operational phase transition to taxi-out (or the take-off event), and a data segment that corresponds to a fuel flow rate of greater than zero. To illustrate, the processor 104 may generate an interval of time values or timestamps that corresponds to a time period between a start of the initial phase and the operational phase transition to taxi out phase. The processor 104 may determine an intersection between the generated interval and the data segment to identify the engine start event.

The processor 104 may generate the output 142 based on the identified operational phases, the operational phases transitions, the events, or a combination thereof. In some implementations, the processor 104 may generate the output 142 in response to user input or identifying a final operational phase or event.

Additionally, a particular operational phase may be associated with a delay (e.g., a time offset value). The delay (e.g., the time offset value) may represent a minimum time between transitioning from the particular operational phase to another operational phase. To illustrate, transition triggers (e.g., candidate operational phase transitions) that occur during the delay may be discarded or ignored. For example, the processor 104 may not evaluate a corresponding look-ahead condition when the particular trigger condition is satisfied during the delay.

Additionally or alternatively, the system 100 may include look-behind conditions. Although, the system 100 has been described as including look-ahead conditions 138, in other implementations the system 100 (e.g., the processor 104) may use look-behind conditions in addition to the look-ahead conditions 138, or in place of the look-ahead conditions 138.

In other implementations, the processor 104, the memory 106, and the display 108, may be located on board the vehicle 102. The processor 104 may generate the output 142 during operation of the vehicle 102 in substantially real-time. If look-ahead conditions are being used, there may be a short delay (corresponding to the look-ahead period)

before operational phase transitions or events are generated. If look-behind conditions are being used, operational phase transitions or events may be generated in substantially real time.

In some implementations, the processor 104 may be configured to pre-process the sensor data 116 or the data 140 prior to identifying operational phases. To illustrate, the processor 104 may identify a set of operational phase transition conditions associated with the vehicle 102 based on the operational phase definitions 132, the phase transition rules 134, the trigger conditions 136, the look-ahead conditions 138, or a combination thereof. The processor 104 may segment the sensor data 116 or the data 140 according to the set of operational phase transition conditions associated with the vehicle 102, such as the trigger conditions 136 and the look-ahead conditions 138. For example, the processor 104 may generate data segments that correspond to the set of operational phase transition conditions and that satisfy the set of operational phase transition conditions.

In a particular implementation, the sensor data 116 or the data 140 may be evaluated based on an enablement condition. The enablement condition may indicate whether the sensor data 116 or the data 140 may be used to determine operational phases. For example, all or a substantial portion of the sensor data 116 or the data 140 may be evaluated based on a condition. If the enablement condition is satisfied, the processor 104 may pre-process the sensor data 116 or the data 140, perform data segmentation, or identify operational phases, or a combination thereof. If the enablement condition is not satisfied, the processor 104 may attempt to repair the data (e.g., add timestamps, add null values, synchronize the data, smooth the data, etc.), issue an error notification, cease identifying operational phases, or a combination thereof. The enablement condition may be associated with checking the sensor data 116 for errors. For example, the enablement condition may be satisfied if a number of errors of the sensor data 116 or the data 140 is less than or equal to a threshold number of errors.

By performing parameter segmentation, data segments (e.g. intervals) may be generated by evaluating data once. For example, each parameter value of the data may be evaluated once against a plurality of conditions to generate the data segments. The data segments may be used to identify multiple operational phases, operational phase transitions, events, or a combination thereof, without re-evaluating the data (or a portion thereof) each time. Thus, by performing parameter segmentation an increase in speed and efficiency may be obtained over systems that scan each parameter value over a time period. By producing an output of a graphical representation of the operational phases and data, the trigger conditions and look-ahead conditions may be easily adjusted and checked for accuracy. Parameter segmentation may also increase speed and efficiency when adjusting or updating the trigger conditions and look-ahead conditions as compared to processing (e.g., reprocessing) all of the data values each time a change or an update occurs.

Figure 2:
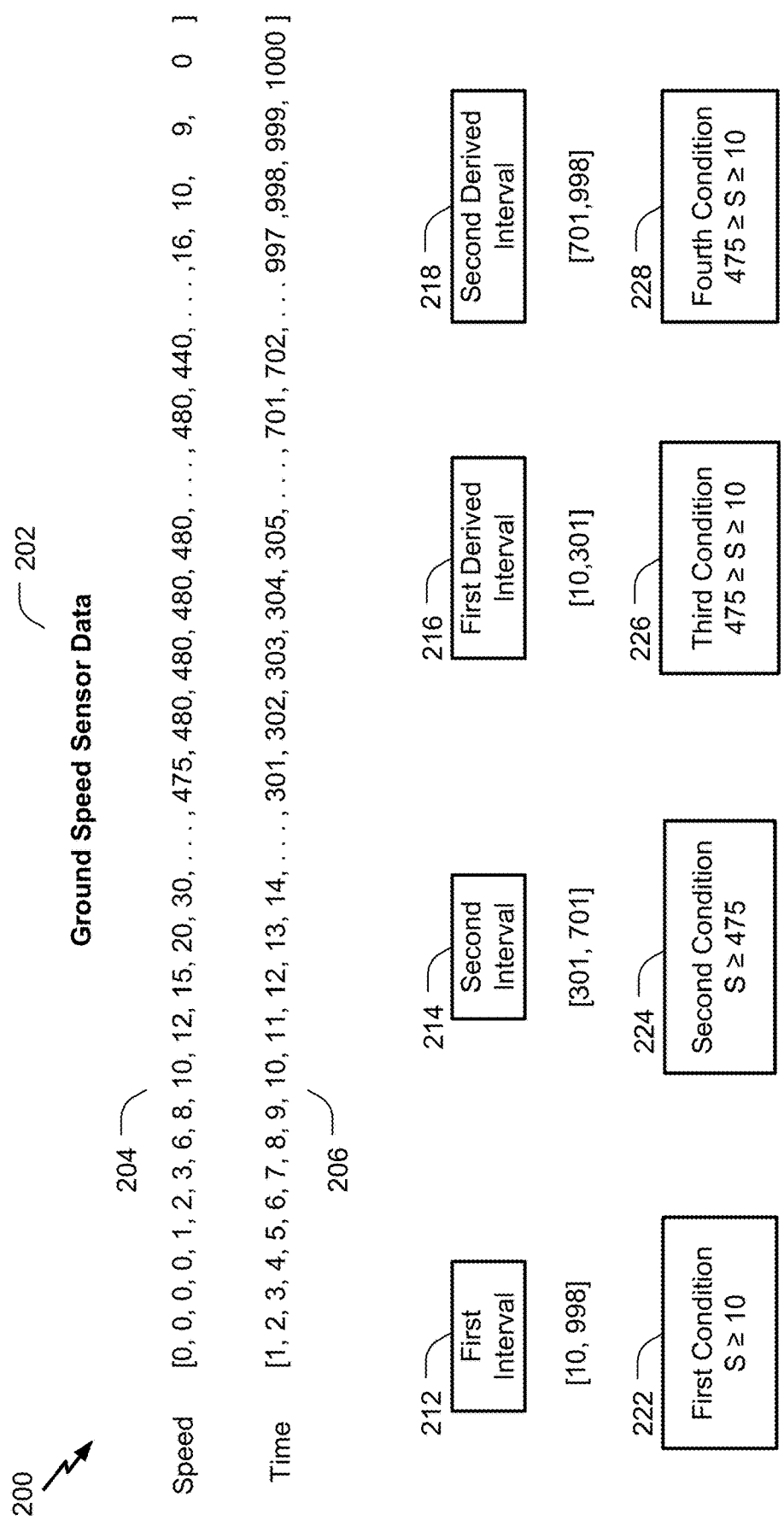
FIG. 2 is a diagram that illustrates an example of parameter segmentation.

FIG. 2 illustrates an example 200 of parameter segmentation. Parameter segmentation may be performed by the system 100 of FIG. 1. For example, the processor 104 of FIG. 1 may perform parameter segmentation for each parameter (e.g., a speed parameter, an altitude parameter, etc.) of the sensor data 116 of FIG. 1 that is used for operational phase detection.

In the example 200 illustrated in FIG. 2, parameter segmentation for ground speed sensor data 202 is shown. The ground speed sensor data 202 may be generated by a ground speed sensor of a vehicle, such as the vehicle 102 of FIG. 1, during operation. The ground speed sensor data 202 may be part of (or included in) the sensor data 116 or the data 140 of FIG. 1. The ground speed sensor data 202 may include a plurality of values 204 (e.g., ground speed values) of a ground speed parameter. The ground speed sensor data 202 may also include a plurality of time values 206 (e.g., timestamps) that correspond to each value of the plurality of values 204. A processor may segment the ground speed sensor data 202 (e.g., bin the data) into data segments (e.g., intervals) according to trigger conditions (e.g., first conditions), look-ahead conditions (e.g., second conditions), or both. The data segments (e.g., intervals) may represent a time index (e.g., a vector of sequential timestamps) during which the parameter satisfies a condition.

To illustrate, the operational phase conditions may include a first condition 222 of ground speed greater than or equal to 10 knots (e.g., a first detection threshold), and a second condition 224 of ground speed greater than or equal to 475 knots (e.g., a second detection threshold). In some implementations, the first condition 222 may correspond to a trigger condition for an operational phase transition from a taxi phase to a take-off roll phase. The second condition 224 may be associated with a trigger condition for an operational phase transition to a cruise phase. The processor may determine (e.g., identify) a first interval 212 that corresponds to a first time index when the corresponding ground speed value is greater than or equal to 10 knots (e.g., from a timestamp 10 to a timestamp 998 in the ground speed sensor data 202 illustrated in FIG. 2). The processor may determine (e.g., identify) a second interval 214 that corresponds to a second time index when the corresponding ground speed value is greater than or equal to 475 knots (e.g., from a timestamp 301 to a timestamp 701 in the ground speed sensor data 202 illustrated in FIG. 2).

The processor may be configured to generated derived intervals based on the determined or identified intervals. For example, the processor may derive (or generate) a first derived interval 216 and a second derived interval 218 based on the first interval 212 and the second interval 214. To illustrate, the processor may generate the first derived interval 216 based on a first timestamp (e.g., 10) of the first interval 212 and based on a first timestamp (e.g., 301) of the second interval 214. The processor may generate the second derived interval 218 based on a second timestamp (e.g., 998) of the first interval 212 and based on a second timestamp (e.g., 701) of the second interval 214. Each derived interval may be associated with a condition. For example, the first derived interval 216 may be associated with a third condition 226 of ground speed less than or equal to 475 knots and greater than or equal to 10 knots (e.g., a first detection range). The second derived interval 218 may be associated with a fourth condition 228 of ground speed less than or equal to 475 knots and greater than or equal to 10 knots (e.g., a second detection range). In other implementations, the third condition 226 and the fourth conditions 228 may be different conditions, such as ground speed less than or equal to 10 knots.

The processor may use the intervals 212-218 in determining operational phase transitions, as described with reference to FIG. 1. For example, the first interval 212 may be used to generate a candidate operational phase transition (e.g., a first transition trigger). The first interval 212 may correspond to a range of times during which the first condition is satisfied. To illustrate, the timestamp of 10 may indicate the first transition trigger and that a look-ahead condition (e.g., a second condition) may be applied to the ground speed sensor data 202 or other parameters of the sensor data 116. The first transition trigger may be indicative of an operational phase transition from the taxi phase to the take-off roll phase when a look-ahead condition is satisfied.

In some implementations, the processor may use the second interval 214 to generate the operational phase transition. To illustrate, the processor may determine a look-ahead period based on phase transition rules, trigger conditions, look-ahead conditions, or a combination thereof. For example, the look-ahead period may correspond to a look-ahead condition (e.g., the second condition). The processor may determine a look-ahead interval (e.g., [10, 610]) based on the look-ahead period (e.g., 600 seconds) that corresponds to the second condition. The processor may identify the operational phase transition by determining that the second interval 214 overlaps in time with at least a portion of the look-ahead interval. For example, the processor may determine that the second interval 214 (e.g., [301, 701]) intersects a portion the look-ahead interval, such as timestamps 301 to 610. The processor may determine that the look-ahead condition is satisfied based on the second interval 214 intersecting the portion of the look-ahead period. The processor may identify the operational phase transition based on determining that the second condition is satisfied during a portion of the look-ahead period. Although the first condition and the second condition are based on the same parameter (e.g., the ground speed parameter), in other implementations the second condition may be based on a distinct parameter (e.g., an altitude parameter). Additionally, although the first condition and the second condition are based on a detection threshold, in other implementations, the first condition, the second condition, or both, may be based on a detection range.

In some implementations, the trigger conditions may be changed or updated. For example, the first condition 222 may be changed from 10 knots to 5 knots. In this example, the processor may derive (or generate) an updated interval that corresponds to the updated first condition based on the first interval 212. For example, the processor may compare the updated first condition to the first condition 222 of the first interval 212. To illustrate, the processor may determine that the first interval 212 satisfies the updated first condition based on determining that any parameter value that satisfies the first condition also satisfies the updated first condition. The processor may determine that the parameter values of the first interval 212 do not have to be evaluated for the updated first condition and that parameter values outside of the first interval have to be evaluated for the updated first condition.

Additionally, the processor may perform an interval operation based on a data record interval (e.g., [0, 1000]) and the first interval 212 to determine a set of intervals that corresponds to which data to evaluate for the updated first condition. The processor may determine that the set of intervals (e.g., [1, 10] and [998, 1000]) includes timestamps 1-10 and 998-1000 based on the data record interval (e.g., [0, 1000]) minus the first interval 212. The processor may evaluate the set of intervals based on the updated first condition to determine that the updated interval (e.g., [8-999]) includes the timestamps from 8 to 999. For example, the processor may evaluate the corresponding ground speed values of the timestamps of the set of intervals based on the updated first condition and determine that timestamps 8, 9, and 999 have corresponding ground speed values that satisfy the updated first condition. Thus, the processor may derive the updated interval without evaluating (re-evaluating) the corresponding ground speed values of the first interval 212 based on the updated first condition.

As another example, the first condition 222 may be changed from 10 knots to 15 knots. The processor may derive (or generate) an updated interval based on the first interval 212 and the second interval 214. For example, the processor may compare the updated first condition to the first condition 222 of the first interval 212 and to the second 224 condition of the second interval 214. The processor may determine that the first condition 222 does not satisfy the updated first condition. Thus, the processor may determine that data of the first interval 222 and data outside of the first interval 212 does not satisfy the updated condition based on determining that all parameter values that satisfy the first condition do not satisfy the updated first condition. The processor may determine that the second interval 214, timestamps 301-701, already satisfies the updated trigger condition based on determining that all parameter values that satisfy the second condition 224 also satisfy the updated first condition.

Additionally, the processor may perform an interval operation based on comparing the updated first condition to the first condition and to the second condition. For example, the processor may determine a set of intervals that corresponds to which data to evaluate for the updated first condition based on the first interval 212 and the second interval 214. The processor may determine that the set of intervals (e.g., [10, 301] and [701, 998]) includes timestamps 10-301 and 701-998 based on an interval operation of the first interval 212 minus the second interval 214. The processor may determine that the updated interval includes timestamps 12-997 (e.g., [12-997]) based on the evaluating the corresponding ground speed values of the set of intervals based on the updated first condition. Thus, the processor may derive the updated interval by evaluating the first condition 222 of the first interval 212, the second condition 224 of the second interval 214, and the corresponding ground speed values of the set of intervals based on the updated first condition. Accordingly, the processor may derive the updated interval without evaluating (re-evaluating) the corresponding ground speed values of the first interval 212 and second interval 214 based on the updated first condition. In other implementations, the processor may derive (or generate) a new interval for the updated first condition and may maintain the first interval 212.

The processor may adjust an output in response to the conditions (e.g., trigger conditions, look-ahead conditions, look-behind conditions, or a combination thereof) being changed or updated. The output may correspond to the output 142 of FIG. 1. To illustrate, the processor may update a graphical representation of one or more operational phases, operational phase transitions, events, or a combination thereof, in response to the first condition 222 being changed or updated. Additionally or alternatively, the processor may generate a second output in response to the look-ahead conditions being changed or updated.

In some implementations, a trigger condition, a look-ahead condition, a look-behind condition, or a combination thereof, may include multiple conditions based on multiple parameters. For example, a particular trigger condition may include the second condition 224 based on the ground speed parameter and another condition based on another parameter (e.g., a change in altitude parameter). To illustrate, a particular trigger condition may be satisfied when the second condition 224 is satisfied at a same time when a change in altitude parameter value satisfies a condition of change in altitude greater than or equal to 400 feet per minute.

By performing parameter segmentation, data segments (e.g. intervals) may be generated by evaluating the data once. For example, each parameter value may be evaluated once against a plurality of conditions to generate the data segments. The processor may identify multiple operational phases, operational phase transitions, events, or a combination thereof, based on the data segments without re-valuating the data (or a portion thereof) each time. For example, the processor may reuse a data segment, associated with identifying a first operational phase transition, for identifying subsequent phase transitions. Additionally, parameter segmentation allows more efficient operational phase detection when conditions are changed or updated, as compared to processing (e.g., reprocessing) all of the data values each time a change or an update occurs. For example, updated or new data segments may be generated or derived based on evaluating a portion of the data, and operational phases may be identified based on the updated or new data segments.

Figure 3:
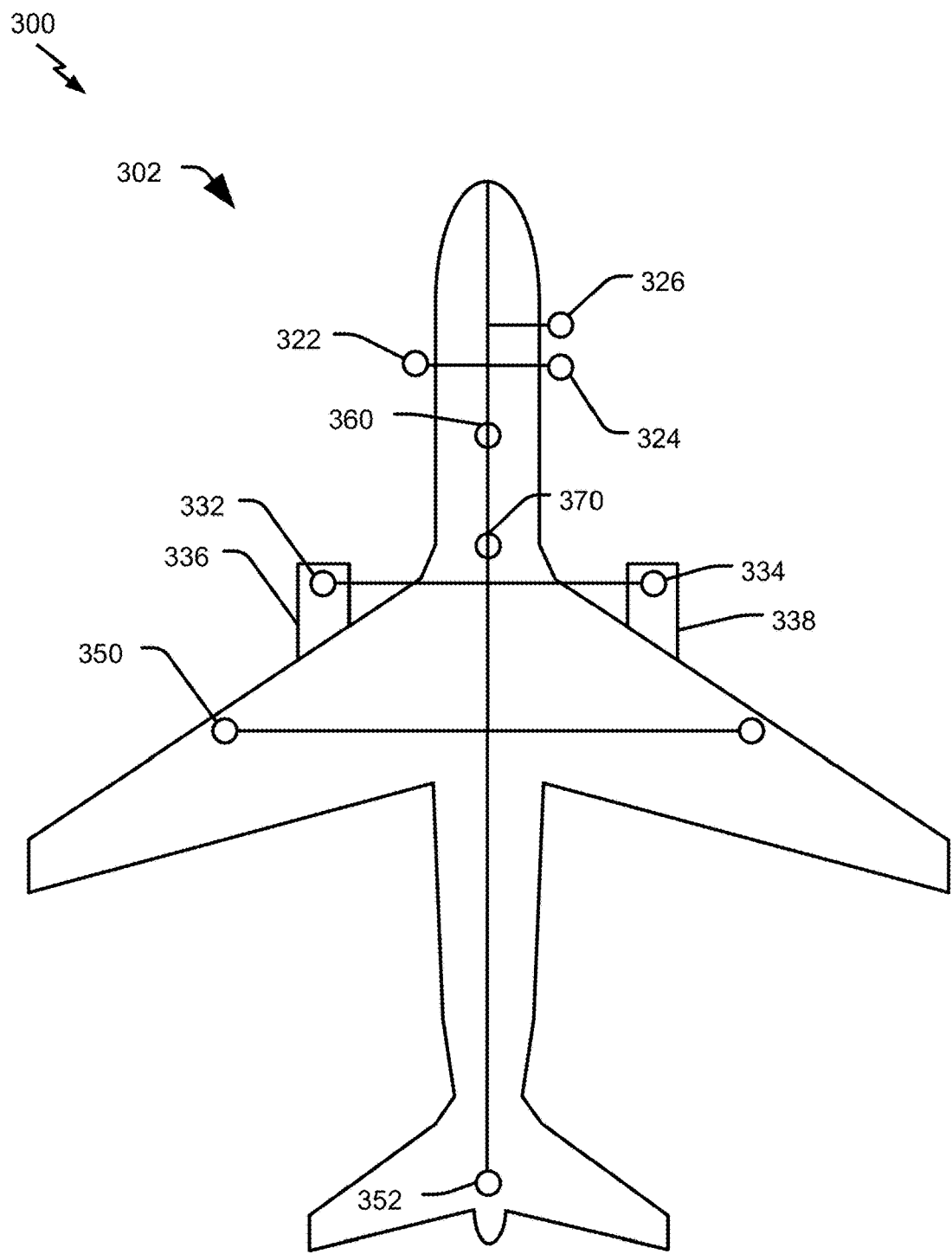
FIG. 3 is a diagram that illustrates an example configuration of sensors of a vehicle.

FIG. 3 illustrates a diagram of an example configuration of sensors of a vehicle 302. The vehicle 302 may include or correspond to the vehicle 102, and the sensors may include or correspond to the plurality of sensors 112 of the vehicle 102 of FIG. 1. The sensors may be configured to generate the sensor data 116 of FIG. 1.

The vehicle 302 may include a plurality of different types of sensors. For example, the vehicle 302 may include one or more speed sensors (e.g., air speed, ground speed, wind speed, etc.), fuel flow sensors, engine sensors (e.g., temperature, pressure, RPM (tachometer), etc.), altitude sensors, air pressure sensors, air temperature sensors, vehicle positioning sensors (e.g., global positioning system (GPS) sensors), landing gear position sensors, control surface (wing, rudder, flaps, ailerons, stabilizers, spoilers, elevators, etc.) position sensors, or a combination thereof, as illustrative, non-limiting examples. In some implementations, the landing gear position sensors and the control surface position sensors may generate state data that indicates a state or position of a system of the vehicle 302. For example, the landing gear position sensors may generate state data that indicates whether the landing gear are deployed or retracted. As another example, a particular control surface position sensor (e.g., a flap sensor) may indicate an amount (e.g., degrees) of flap deployment, such as 5 degrees, 10 degrees, 30 degrees, etc.

In the example configuration illustrated in FIG. 3, the vehicle 302 includes a speed sensor 322 and an altitude sensor 324. The vehicle 302 may also include an air pressure sensor 326. The vehicle 302 may include a fuel flow sensor 332 for a first engine 336 and an engine sensor 334 for a second engine 338. The vehicle 302 may include control surface sensors 350 and 352 and a landing gear sensor 360. The vehicle 302 may further include a positioning sensor 370.

Additionally, the vehicle 302 may include a processor and a data store device. The processor may include or correspond to the processor 104 of FIG. 1, and the data storage device may include or correspond to the memory 106, the data storage device 114 of FIG. 1, or both. The processor may be coupled to the data storage device and to the sensors. In some implementations, the processor may be wirelessly coupled to one or more of the sensors. The processor may receive the sensor data generated by the sensors.

The vehicle 302 may further include a display. The display may include or correspond to the display 108 of FIG. 1. The display may be configured to receive an output from the processor and to display the output via a user interface.

During operation of the vehicle 302, the sensors may capture sensor data and send the sensor data to a processor of the vehicle 302. The processor of the vehicle 302 may generate timestamps and store the sensor data and corresponding timestamps at the data storage device. The processor may segment the data to generate and update intervals of parameter values that satisfy conditions (e.g., trigger conditions, look-ahead conditions, look-behind conditions, or a combination thereof). The processor may identify one or more operational phases, operational phase transitions, events, or a combination thereof, as described with reference to FIG. 1.

In other implementations, the vehicle 302 may store the sensor data at a data storage device. The vehicle 302 may transfer the sensor data to a processor for future processing during or after operation of the vehicle 302. The sensor data may be processed as described with reference to FIG. 1.

By identifying operational phases, operational phase transitions, and events during operation of a vehicle, operators of the vehicle may have access to additional information as compared to systems that evaluate vehicle operation after the operation has ended.

Figure 4:
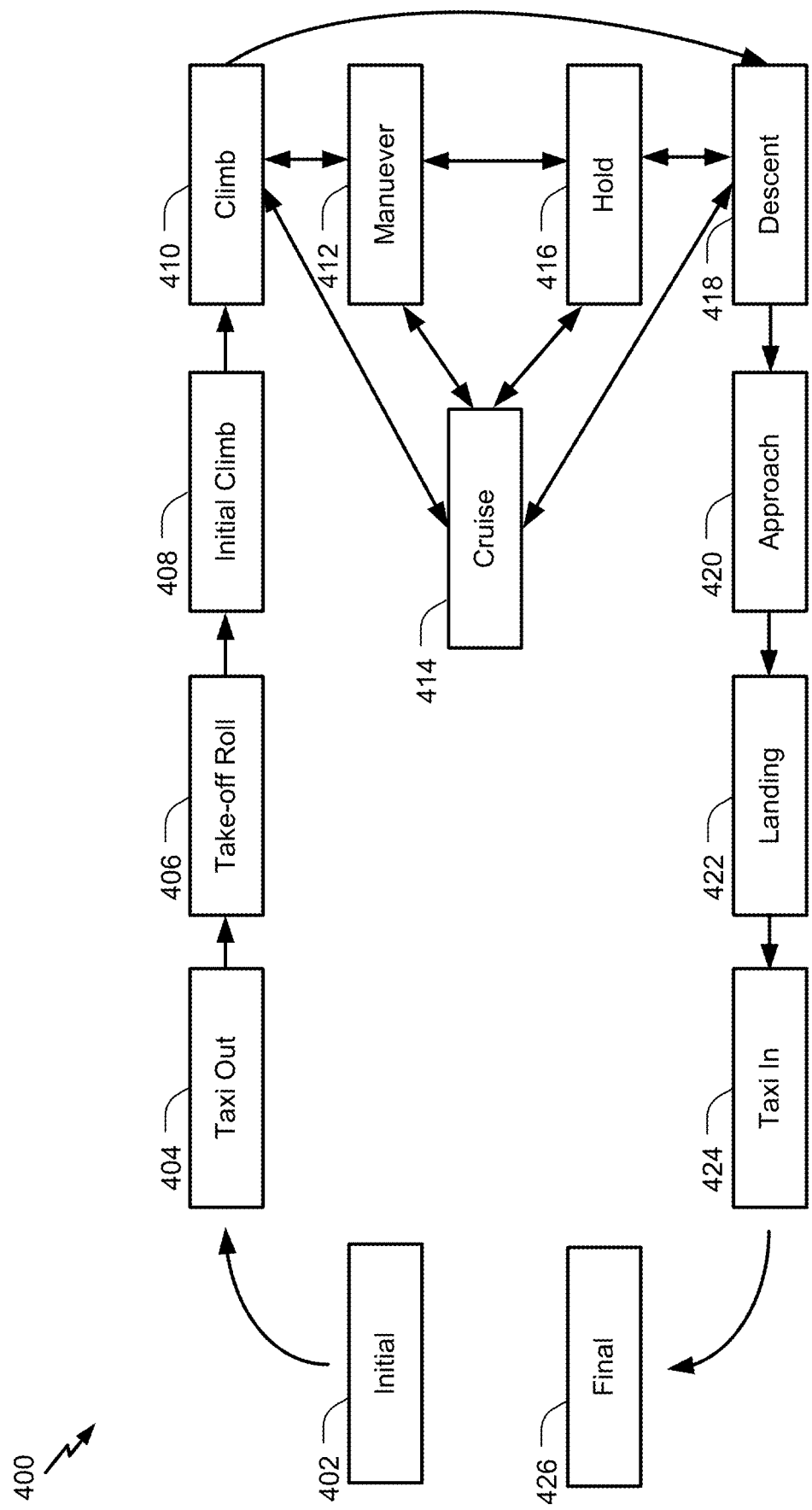
FIG. 4 is a block diagram that illustrates an example of an operational phase transition diagram.

FIG. 4 illustrates an example of an operational phase transition diagram 400. The operational phase transition diagram 400 may correspond to operational phase transitions of the vehicle 102 of FIG. 1. For example, the phase transition rules 134 of FIG. 1 may be based on or correspond to the operational phase transition diagram 400. To illustrate, the phase transition rules 134 may include a first rule that indicates that from a taxi out phase 404 the vehicle 102 may transition into a take-off roll phase 406. The phase transition rules 134 may include a second rule that indicates that from a cruise phase 414, the vehicle 102 may transition into a plurality of operational phases, such as a climb phase 410, a maneuver phase 412, a hold phase 416, or a descent phase 418, as illustrative, non-limiting examples.

Each operational phase transition may be identified based on sensor data satisfying one or more trigger conditions, one or more look-ahead conditions, one or more look-behind conditions, or a combination thereof, as described with reference to FIG. 1.

In other implementations, more or fewer operational phases may be included. For example, for short operations (e.g., a short flight) the cruise phase 414 may be omitted, and the vehicle may transition directly from the climb phase 410 to the descent phase 418. Additionally or alternatively, other operational phases may be included. For example, operational phases may correspond to a particular vehicle type. To illustrate, a car may include an ignition phase, a reverse phase, a drive phase, a braking phase, a turn phase, a lane change phase, and a parallel park phase, as illustrative, non-limiting examples. As another illustration, a spacecraft may include an ignition phase, a lift-off phase, a first burn phase, a second burn phase, an orbit phase, a re-entry phase, and a splashdown phase, as illustrative, non-limiting examples.

In the example illustrated in FIG. 4, a vehicle may begin operation in an initial phase 402 (e.g., docked, boarding, ignition, etc.). The vehicle may transition from the initial phase 402 into the taxi out phase 404. An operational phase transition from the initial phase 402 into the taxi out phase 404 may be identified based on a speed parameter, a fuel flow rate parameter, an altitude parameter, a control surface position parameter, a landing gear position parameter, or a combination thereof. The vehicle may transition from the taxi out phase 404 to the take-off roll phase 406. An operational phase transition from the taxi out phase 404 to the take-off roll phase 406 may be identified based on a speed parameter, a fuel flow rate parameter, an altitude parameter, a control surface position parameter, a landing gear position parameter, or a combination thereof.

The vehicle may transition from the take-off roll phase 406 into an initial climb phase 408. An operational phase transition from the take-off roll phase 406 into an initial climb phase 408 may be identified based on a speed parameter, a fuel flow rate parameter, an altitude parameter, a control surface position parameter, a landing gear position parameter, or a combination thereof. To illustrate, the initial climb phase 408 may be identified based on a rate of change of the altitude parameter, as an illustrative, non-limiting example. The vehicle may transition from the initial climb phase 408 to the climb phase 410. An operational phase transition from the initial climb phase 408 to the climb phase 410 may be identified based on a speed parameter, a fuel flow rate parameter, an altitude parameter, a control surface position parameter, a landing gear position parameter, a heading parameter, an aircraft positioning parameter, or a combination thereof.

The vehicle may transition from the climb phase 410 to one of a plurality of phases. For example, the vehicle may transition from the climb phase 410 to a maneuver phase 412, to a cruise phase 414, to a hold phase 416, or to a descent phase 418. An operational phase transition from the climb phase 410 to cruise phase 414 may be identified using different parameters than an operational phase transition from the climb phase 410 to the descent phase 418. For example, the operational phase transition to the cruise phase 414 may be identified based on a speed parameter, a fuel flow rate parameter, an altitude parameter, a control surface position parameter, or a combination thereof, and the operational phase transition to the descent phase 418 may be identified based on a speed parameter, a fuel flow rate parameter, an altitude parameter, a control surface position parameter, a landing gear position parameter, or a combination thereof.

The vehicle may transition between (e.g., back and forth from) the operational phases of the climb phase 410, the maneuver phase 412, the cruise phase 414, the hold phase 416, and the descent phase 418. The vehicle may transition between the operational phases 410-418 based on a speed parameter, a fuel flow rate parameter, an altitude parameter, a control surface position parameter, a landing gear position parameter, a heading parameter, an aircraft positioning parameter, or a combination thereof.

The vehicle may transition from the descent phase 418 to an approach phase 420. An operational phase transition from the descent phase 418 to the approach phase 420 may be identified based on a speed parameter, a fuel flow rate parameter, an altitude parameter, a control surface position parameter, a landing gear position parameter, a heading parameter, an aircraft positioning parameter, or a combination thereof. The vehicle may transition from the approach phase 420 to the landing phase 422. An operational phase transition from the approach phase 420 to the landing phase 422 may be identified based on a speed parameter, a fuel flow rate parameter, an altitude parameter, a control surface position parameter, a landing gear position parameter, or a combination thereof. In some implementations, the vehicle may transition from the approach phase 420 to the hold phase 416 and from the hold phase 416 to the approach phase 420.

The vehicle may transition from the landing phase 422 to the taxi in phase 424. An operational phase transition from the landing phase 422 to the taxi in phase 424 may be identified based on a speed parameter, a fuel flow rate parameter, an altitude parameter, a control surface position parameter, or a combination thereof. The vehicle may transition from the taxi in phase 424 to the final phase 426 (e.g., docking, deplaning, unloading, etc.). An operational phase transition from the taxi in phase 424 to the final phase 426 may be identified based on a speed parameter, a fuel flow rate parameter, an altitude parameter, a control surface position parameter, or a combination thereof.

By using trigger conditions, look-ahead conditions, look-behind conditions, or a combination thereof, for identifying operational phases, operational phase transitions, and events, greater accuracy can be achieved as compared to using only the trigger conditions.

Figure 5:
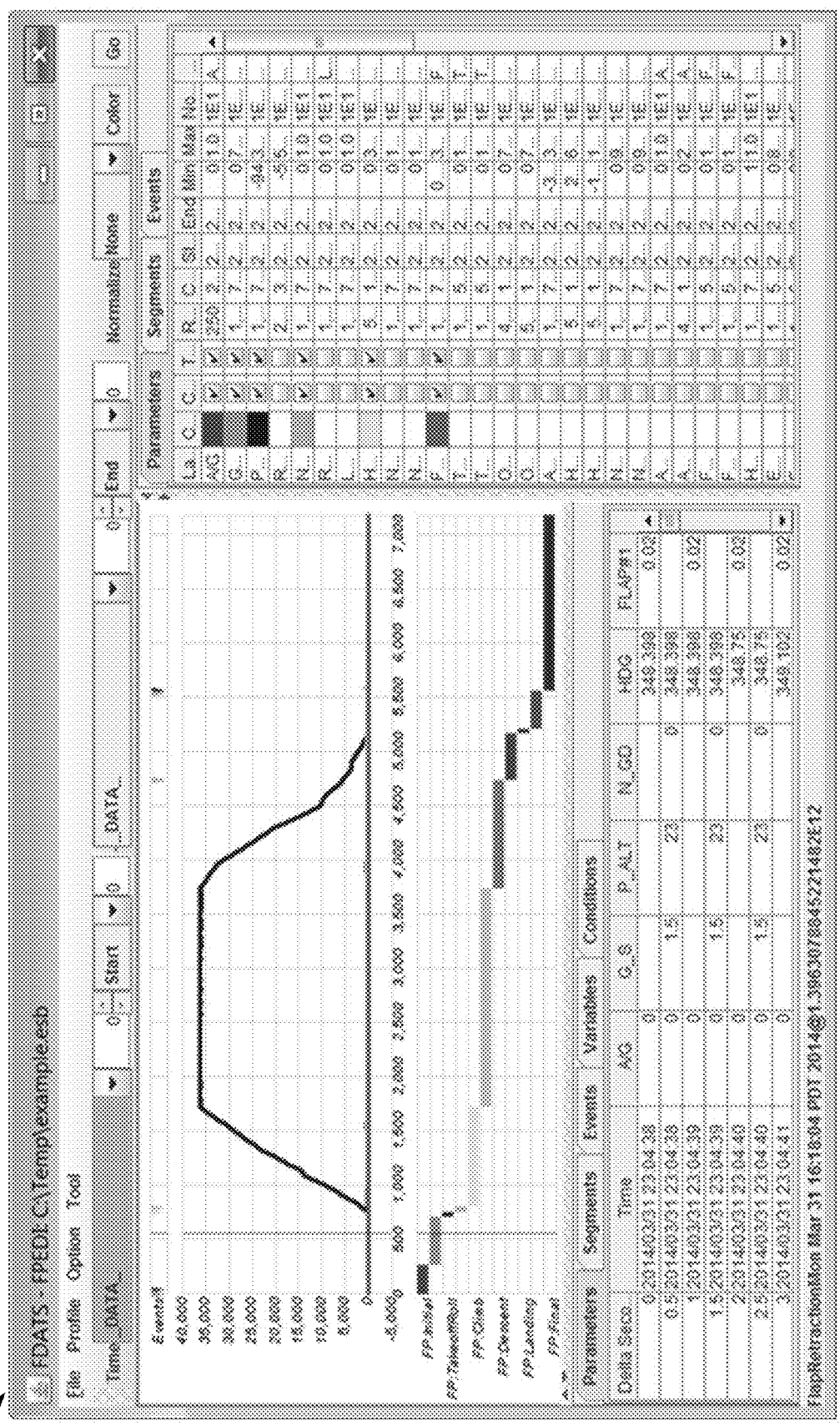
FIG. 5 is an example of an illustrative graphical user interface for operational phase detection.

FIG. 5 illustrates a particular example of an illustrative GUI 500 for operational phase detection. The GUI 500 may be generated by an output of a processor, such as the output 142 of the processor 104 of FIG. 1. The GUI 500 may be updated or changed based on an input, such as the input 144 of FIG. 1. The GUI 500 may be output at (or by) a display, such as the display 108 of FIG. 1. The GUI 500 may be responsive to user input. For example, the GUI 500 may be updated in response to user input.

In the example illustrated in FIG. 5, the GUI 500 includes a visualization chart, a summary and selection table, and a detail table. The visualization chart is located on the upper left side of the GUI 500. The visualization chart includes a graphical display of a chronological ordering of the operational phases, the operational phase transitions, and the events, or a combination thereof. For example, the visualization chart may display a plurality of segments (e.g., occurrences of the operational phases). The segments may be separated by the operational phase transitions, events, or both. Additionally, or alternatively, the events may be denoted by symbols. In some implementations, the segments may be color coded. The visualization chart may include a synchronized time axis (e.g., a horizontal axis). The visualization chart may further display one or more parameters. For example, the visualization chart may display an altitude parameter on a vertical axis and a time axis on a horizontal axis, as an illustrative, non-limiting example.

In some implementations, the parameters of the visualization chart may be normalized. For example, the parameters of the visualization chart may be globally normalized or locally normalized. To illustrate, when globally normalized, each value of a parameter may be normalized over an entire data record. When locally normalized, each value of a parameter may be normalized over a portion of the data record, such as a displayed time period of the visualization chart. Additionally, or alternatively, each value of a parameter may be normalized by a power of 10 (e.g., 0.001 or 100). In other implementations, the parameters of the visualization chart may not be normalized.

The summary and selection table is located (e.g., displayed) on the right side of the GUI 500. The summary and selection table may include selection tables for parameters, segments, events, or a combination thereof. The selection tables may provide a visual summary of the parameters, the segments, the events, or a combination thereof. Each selection table may include one or more fields (e.g., columns). The summary and selection table may be configured to control the visualization chart, as further described with reference to FIG. 6.

The detail table is located on the bottom left of the GUI 500. The detail table may include tables for displaying parameters, segments, events, variable, and conditions, as further described with reference to FIG. 7.

In some implementations, the GUI 500 may include a profile pane and profiles. In FIG. 5, the profile pane is located at the top of the GUI 500. The GUI 500 may enable a user to select a profile from multiple stored profiles and to select a data record (e.g., sensor data corresponding to a particular operation of a vehicle) from multiple stored data records. The profile may include detection logic. The detection logic may include or correspond to the operational phase definitions 132, the phase transition rules 134, the trigger conditions 136, the look-ahead conditions 138 of FIG. 1, or a combination thereof. The profiles may include or control various settings of the GUI 500, as further described with reference to FIG. 8.

During operation, a user may select a particular profile from the multiple stored profiles. The GUI 500 may send an input to a processor. The processor may identify operational phases, operational phase transitions, and events based on the input. The GUI 500 may receive an output of the processor and the GUI 500 may display a graphical representation of operational phases, operational phase transitions, and events. The user may then adjust a condition using the GUI 500 or another program to generate an updated profile. The user may select the updated profile. The processor may identify operational phases, operational phase transitions, and events based on the update profile. The GUI 500 may receive and display an updated graphical representation of operational phases, operational phase transitions, and events.

By generating an adjustable graphical representation at a GUI, vehicle operational phases, operational phase transitions, and events can be more efficiently checked and adjusted as compared to systems that produce a text output of operational phases, operational phase transitions, and events.

Figure 6:
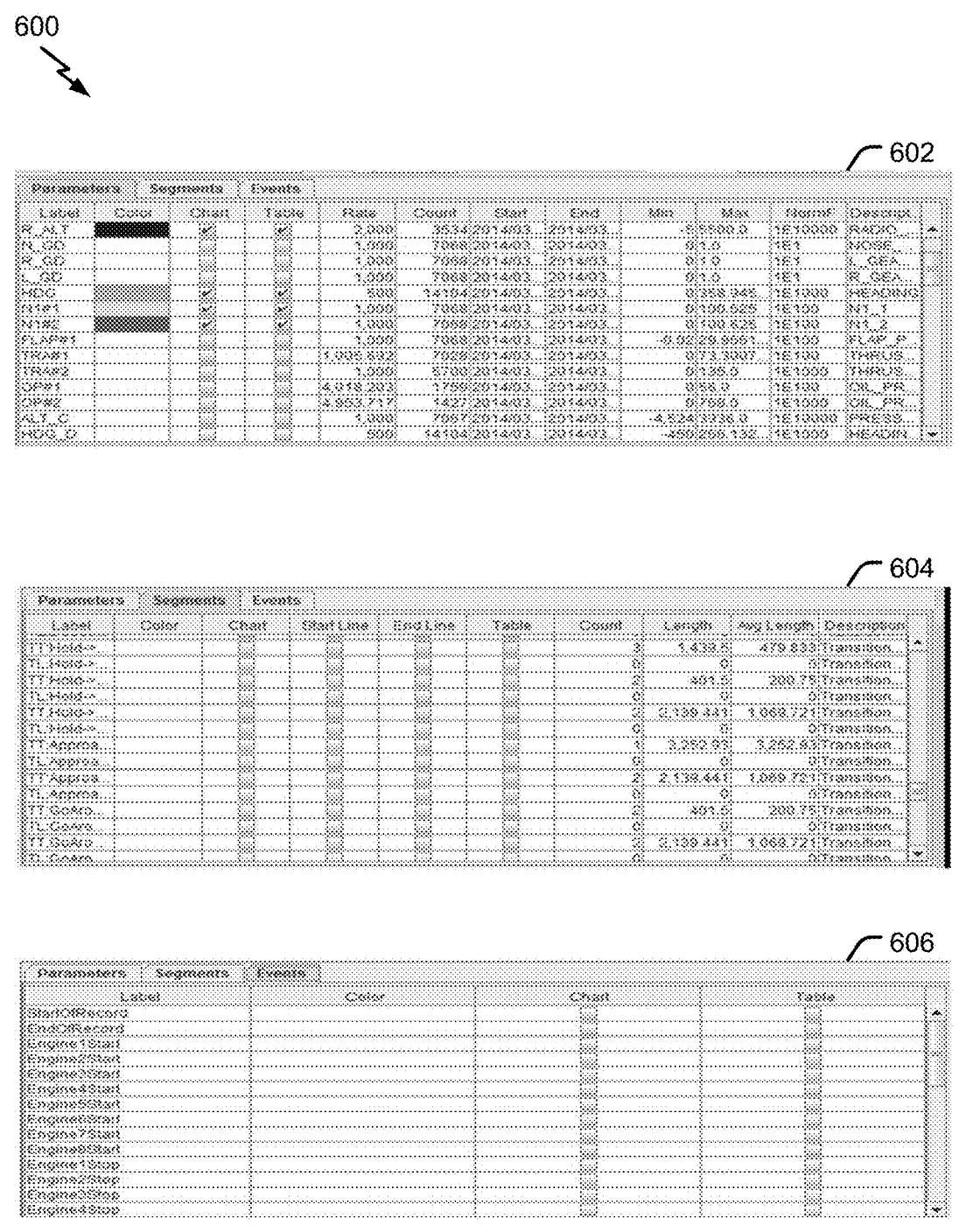

FIG. 6 illustrates a particular example of an illustrative GUI 600 for operational phase detection. The GUI 600 may correspond to the summary and selection table of the GUI 500 of FIG. 5.

The summary and selection table may include multiple tabs and each tab may include multiple fields (e.g., columns). Each field may include a plurality of rows that include values, checkboxes, colors, or a combination thereof. In the example configuration illustrated in FIG. 6, the summary and selection table includes a parameters tab 602, a segments tab 604, and an events tab 606. The parameters tab 602 may include a label field, a color field, a chart field, and a table field. The label field may indicate a parameter name (e.g., an abbreviation of a parameter name), and the color field may indicate a color associated with the parameter. For example, the visualization chart may use the color to display the parameter. The chart field and the table field may include checkboxes that control whether a parameter is displayed in the visualization chart or the detail table, respectively.

The parameters tab 602 may also include, a rate field, a count field, a start field, an end field, a minimum field (min), a maximum field (max), a normalization factor (e.g., power of 10 normalization) field (NormF), and a description field. The rate field may indicate an average inter-sample time for the parameters, and the count field may indicate a total number of sampled values. The start field and the end field may indicate an earliest and a latest sampling time of a parameter. The minimum field and the maximum field may indicate a minimum parameter value and a maximum parameter value of the data record. In some implementations, the normalization factor field may be a power of 10 value when the power of 10 normalization method is selected. The normalization factor value may be a power of 10 such that a quotient of the maximum parameter value divided by the normalization factor value comprises a value within a range of values from 0.1 to 1. In other implementations, non-power of 10 normalization factor values may be used. The description field may indicate a parameter name or full text description.

The segments tab 604 may include a listing of segments (e.g., an occurrence of an operational phase) detected or identified from the data. The segments may be defined by detection logic. The segments tab 604 may include a label field, a color field, a chart field, a start line field, an end line field, a table field, a count field, a length field, an average length field, and a description field. The label field may indicate a description for the segments and may include markers. For example, the markers may include a flight phase marker (FP), a transition trigger marker (TT), and a look-ahead trigger marker (TL). The color field, the chart field, the table field, and the description field may be similar to the fields of parameters tab 602. The start line field and the end line field may include checkboxes that control whether a start and an end of the segment are displayed in the visualization chart. The count field may indicate a total number of time intervals in the segments. The length field and average length field may indicate a total length and an average length of all time intervals in the segments.

The events tab 606 may include a listing of events detected or identified from the data. The events tab 606 may include a label field, a color field, a chart field, and a table field. The label field may indicate a name or a description of an event. The color field, the chart field, and the table field may be similar to their respective fields of the parameters tab 602 and the segments tab 604.

The summary and selection table may be configured to automatically select parameters, segments, and events. For example, for a selected operational phase, the summary and selection table may automatically select corresponding parameters, corresponding segments, or a combination thereof, by analyzing the operational phase transitions, trigger conditions, and look-ahead conditions for the selected operational phase. As another example, for a selected event, the summary and selection table may automatically select corresponding parameters, segments, events, or a combination thereof, by analyzing conditions for the selected event. Additionally, the summary and selection table may be configured to clear a selection of parameters, segments, events, or a combination thereof, in response to user input. The GUI 600 may enable a user to analyze operation of a vehicle and update the GUI 600 and a graphical output of the operation of the vehicle (e.g., a visualization chart)

Figure 7:
FIG. 7 is an example of a graphical user interface for operational phase detection.

FIG. 7 illustrates a particular example of an illustrative GUI 700 for operational phase detection. The GUI 700 may correspond to the detail table of the GUI 500 of FIG. 5. The detail table may be located (or displayed) in a bottom left portion of the GUI 500 of FIG. 5. The detail table may enable a user to analyze parameter values, operational phases, operational phase transitions, and events.

The detail table may include multiple tabs and each tab may include multiple fields (e.g., columns). Each field may include a plurality of rows that include values, checkboxes, colors, or a combination thereof. In the example configuration illustrated in FIG. 7, the detail table includes a parameters tab 702, a segments tab 704, an events tab 706, a variable tab 708, and a conditions tab 710. The parameters tab 702 may display times and values for all selected parameters. The parameters tab 702 may allow a user to time-align values of different parameters.

The parameters tab 702 may include a plurality of customizable (e.g., user selectable) fields. The parameters tab 702 may include a delta seconds field that indicates a number of seconds since a start of the data record. The parameters tab 702 may include an epoch time field that indicates a number of milliseconds since an epoch (e.g., a stored time, an operational phase, or an event). In other implementations, other units of measure may be used for the epoch time field, such as seconds, centiseconds, deciseconds, etc. The parameters tab 702 may include a date and time field that indicates, a date, a time, or both. The parameters tab 702 may display parameter values at different sampling rates and may display the sampling rates. The parameters tab 702 may include one or more parameter fields (e.g., ground speed (G_S), altitude rate of change (R_ALT), heading (HDG), first engine parameter (N1#1), second engine parameter (N2#1), first fuel flow rate (FF #1), second fuel flow rate (FF #2), etc.) for displaying sampled values. The parameter fields may indicate values of the parameters. Additionally or alternatively, the parameters tab 702 may display values of parameters that are estimated using different methods, such as nearest slot, nearest neighbor, carry forward, interpolation (e.g., linear, quadratic, cubic, etc.), as illustrative, non-limiting examples.

The segments tab 704 may include time intervals for selected segments. The segments tab 704 may include a label field, a count field, an index field, a length field, a start time field, and an end time field. The label field may indicate a description for the segments and may include markers, as described with reference to FIG. 6. The count field may indicate a total number of time intervals in the segments. The length field may indicate a total length of all time intervals in the segments. The start time field and the end time field may indicate a start time and an end time for each of the segments. In some implementations, the segments tab 704 may include a plurality of start time and end time fields. For example, the segments tab 704 may include a delta second start time field, a millisecond since epoch end time field, or both, as illustrative, non-limiting examples.

The events tab 706 may include a list of events. The events tab 706 may include a column for events and another column for time. Each row of the events column may list a single event, and the time column may list a corresponding time. The time may be displayed in multiple ways, such as delta seconds, time since epoch, or date and time. In some implementations, the events tab 706 may include a plurality of time fields. For example, the events tab 706 may include a delta second time field, an epoch time field, or both, as illustrative, non-limiting examples.

The variables tab 708 may include fields for displaying an actual value of a variable and a source of the variable. The variables may include, a default denoise period variable, a number of engines variable, a number of flaps variable, a flap threshold variable, as illustrative, non-limiting examples. The variables tab 708 may include a variable name field, a value field, a type field, and a source field. The variable name field may indicate a name of the variables. The value field may indicate a value of the variable. The type field may indicate a type of the variable. For example, variables types may include a string type, an estimate type (e.g., a method of estimation), or a double type. The source field may indicate a source of the variable used in the detection conditions. In some implementations, the source field may include a file field and a path field.

The conditions tab 710 may include a listing of selectable conditions. For example, the conditions tab 710 may have a first column listing conditions and a second column including checkboxes to indicate whether the conditions are true in the loaded data. The conditions may include a start-on-ground condition, a start-in-air condition, a high-flight condition, a low-flight condition, as illustrative, non-limiting examples. In some implementations, one or more of the conditions may be mutually exclusive. For example, selecting the start-on-ground condition may deselect the start-in-air condition.

The GUI 700 and the detail table may display data that corresponds to the visualization chart of the GUI of FIG. 5 and to the summary and selection table of the GUI of FIG. 6. The GUI 700 and the detail table may enable a user to analyze operational phases of a vehicle.

Figure 8:
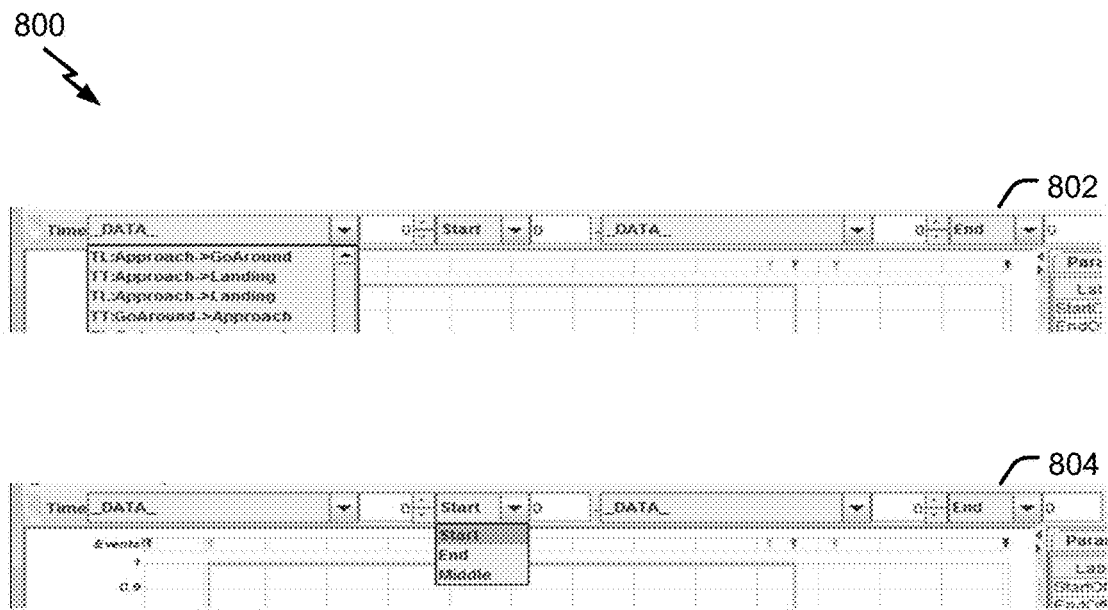
FIG. 8 is an example of a graphical user interface for operational phase detection.

FIG. 8 illustrates a particular example of an illustrative GUI 800 for operational phase detection. The GUI 800 may correspond to the profile pane of the GUI 500 of FIG. 5. The profile pane may be located (or displayed) in a top portion of the GUI 500 of FIG. 5. The profile pane may enable a user to save (e.g., store) settings, retrieve or update profiles, and retrieve data, such as the sensor data 116 of the data 140 of FIG. 1.

The profile pane may include a starting time and an ending time for the visualization chart and the detail table. The profile pane may display a list of segments (e.g., occurrences of operational phases) and each segment may have multiple time intervals. For example, a ground segment may have a first time interval before take-off and a second time interval after touchdown. The list of segments may be displayed via a drop down list as in a first example 802 of the profile pane. The profile pane may display an index (e.g., 0, 1, 2, etc.) to select one of the multiple time intervals. The profile pane may display an anchor point in the selected time interval (e.g., start, middle, end, etc.) as in a second example 804 of the profile pane. The starting time and ending time of the visualization chart may be from different segments. For example, the starting time may be an end time of a first segment, and the end time may be a starting time of another segment. The GUI 800 and the profile pane may enable a user to analyze operational phases of a vehicle and to control a graphical representation (e.g., a visualization chart) of the operational phases.

Figure 9:
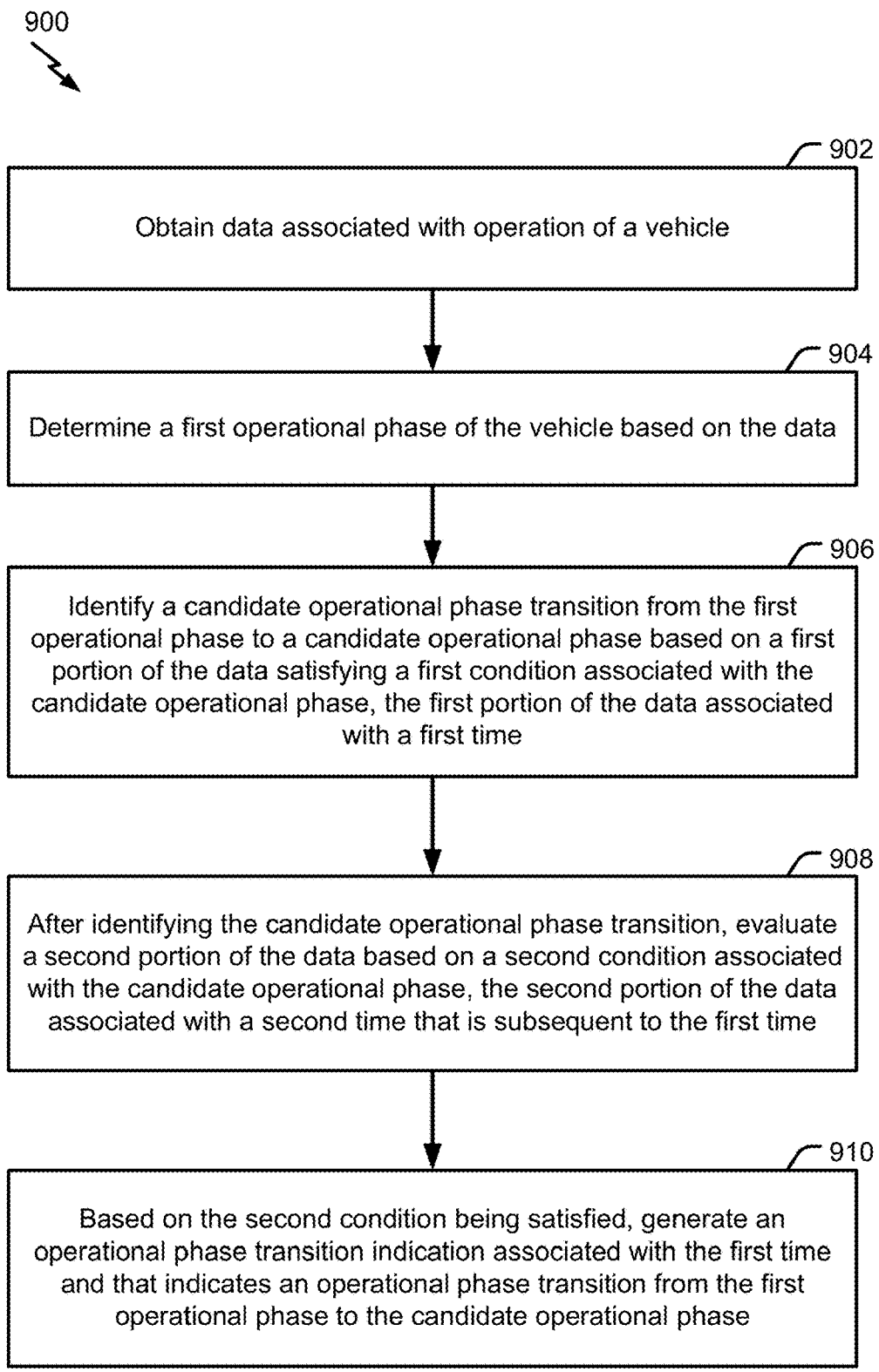
FIG. 9 is a flow chart of an example of a method of operational phase detection.

FIG. 9 illustrates a particular example of a method 900 of detecting operational phases. The method 900 may be performed by the system 100 of FIG. 1, the vehicle 102 of FIG. 1, the processor 104 of FIG. 1, the vehicle 302 of FIG. 3, the GUI 500 of FIG. 5, or a combination thereof. The method 900 may include or correspond to a method for monitoring vehicle operation using operational data acquired during operation of a vehicle.

The method 900 includes, at 902, obtaining, at a processor, data associated with operation of a vehicle. For example, the processor may include or correspond to the processor 104 of FIG. 1, and the vehicle may include or correspond to the vehicle 102 of FIG. 1. The data may include or correspond to the sensor data 116 or the data 140 of FIG. 1. To illustrate, referring to FIG. 1, the processor 104 may receive the sensor data 116 from the data storage device 114 of the vehicle 102. In some implementations, the data includes sensor data from a plurality of sensors onboard the vehicle The method 900 includes, at 904, determining, by the processor, a first operational phase of the vehicle based on the data. For example, the first operational phase may include or correspond to the initial phase 402 of FIG. 4 or one of the operational phases 404-426 of FIG. 4. In some implementations, a current operational phase may correspond to the first operational phase. For example, the current operational phase may be determined and may be set as the first operational phase.

The method 900 may include, at 906, identifying, by the processor, a candidate operational phase transition from the first operational phase to a candidate operational phase based on a first portion of the data satisfying a first condition associated with the candidate operational phase. The first portion of the data may be associated with a first time. For example, a candidate operational phase transition may include or correspond to the first transition trigger or the candidate operational phase transition as described with reference to FIG. 1, a start of the first interval 212 of FIG. 2, the transition trigger (TT) of FIG. 6, or a combination thereof. The candidate operational phase may include or correspond to one of the operational phases 404-426 of FIG. 4. The first portion of the data may include or correspond to a parameter value at a particular time of the sensor data 116 or the data 140 of FIG. 1, the first interval 124 of FIG. 1, the first interval 212 of FIG. 2, or a combination thereof. The first condition may include or correspond to the first condition 222, the second condition 224, the third condition 226, or the fourth condition 228 of FIG. 2.

The method 900 includes, at 908, after identifying the candidate operational phase transition, evaluating, by the processor, a second portion of the data based on a second condition (e.g., a look-ahead condition) associated with the candidate operational phase. The second portion of the data may be associated with a second time that is subsequent to the first time. For example, the second portion of the data may include or correspond to data of the sensor data 116 or the data 140 of FIG. 1 that is subsequent to first time, the second interval 126 of FIG. 1, the second interval 214 of FIG. 2, or a combination thereof.

The method 900 may include, at 910, based on the second condition being satisfied, generating, by the processor, an operational phase transition indication associated with the first time and that indicates an operational phase transition from the first operational phase to the candidate operational phase. For example, the operational phase transition indication may include or correspond to the output 142 of FIG. 1. For example, the operational phase transition may include or correspond to the one of the operational phase transitions described with reference to FIGS. 1, 2, and 4. In some implementations, the method 900 may include generating a user interface display including the operational phase transition indication. In a particular implementation, the operational phase transition indication may include a graphical representation of a set of operational phase transitions identified in the data, and the user interface display may further include timestamped data values associated with detection of each operational phase transition of the set of operational phase transitions.

In some implementations, one or more operations of the method 900 may be repeated. For example, after generating the operational phase transition indication at 910, the method 900 may revert back to 906 to identify other candidate operational phase transitions and repeat operations 906-910. For example, the method 900 may identify a second candidate operational phase transition to a second candidate operational phase after generating the operational phase transition indication at 910. Thus, the method 900 may generate a plurality of operational phase transition indications. In a particular implementation, the candidate operational phase may be set as the current operational phase. For example, the candidate operational phase may be set as the current operational phase if no other candidate operational phase transition is identified from the first operational phase or if the candidate operational phase transition has a higher priority than other identified candidate operational phase transitions from the first operational phase. If no candidate operational phase transitions are found for a particular operational phase, the method 900 may cease operations.

In some implementations, the first portion of the data includes a first parameter value from a first sensor, and the second portion of the data includes a second parameter value from a second sensor, the second sensor distinct from the first sensor. For example, the first portion of the data may include a speed parameter value from a speed sensor and the second portion of that data may include an altitude parameter value from an altitude sensor.

In some implementations, the first condition is satisfied at the first time when a first parameter value of the data is greater than or equal to a first detection threshold, and the second condition is satisfied when a second parameter value of the data is within a look-ahead range during a period between the second time and the first time. For example, the first detection threshold and the look-ahead range may include or correspond to the first condition 222, the second condition 224, the third condition 226, the fourth condition 228 of FIG. 2, or a combination thereof.

In some implementations, the method 900 may include determining whether a parameter value of the first portion of the data is within the first detection range for a particular parameter corresponding to the candidate operational phase, where the candidate operational phase is identified based on determining that the parameter value of the data is within the first detection range. In some implementations, the method 900 may include identifying, by the processor, a plurality of candidate operational phase transitions to identify a number of operational phases indicative of operational phases associated with operation of the aircraft.

In some implementations, the vehicle includes an aircraft, and the data includes data acquired from a speed sensor onboard the aircraft. In some implementations, the method 900 may include determining, by the processor, that the data satisfies the first condition when a first parameter value associated with aircraft speed is greater than or equal to a first detection threshold. For example, the first detection threshold may be associated with the aircraft speed and may correspond to a take-off roll phase.

In some implementations, the data includes data acquired from a sensor for sensing altitude. In such implementations, the method 900 may include determining, by the processor, that the data satisfies the first condition when a first parameter value associated with aircraft altitude is within a first detection range. For example, the first detection range may be associated with an altitude increase and may correspond to a climb phase. Additionally, or alternatively, the method 900 may include determining, by the processor, that the data satisfies the first condition when the first parameter value associated with aircraft altitude is within a second detection range. For example, the second detection range may be associated with an altitude decrease and may correspond to a descent phase.

In some implementations, the method 900 includes displaying, on a user interface display of an aircraft, a chronological ordering of one or more operational phases associated with actual operation of the aircraft based on the identification of the number of candidate operational phases. For example, the display may include or correspond to the display 108 of FIG. 1 or a display of the vehicle 102 of FIG. 1. The GUI may include or correspond to the GUI 500 of FIG. 5, the GUI 600 of FIG. 6, the GUI 700 of FIG. 7, the GUI 800 of FIG. 8, or a combination thereof.

In some implementations, the method 900 includes pre-processing the data by identifying a set of operational phase transition conditions based on rules defining detection of operational phase transitions. For example, the processor 104 may identify the operational phase definitions 132, the phase transition rules 134, the trigger conditions 136, and the look-ahead conditions 138 of FIG. 1. The method 900 may further pre-process the data by binning the data to generate data segments, each data segment corresponding to a set of data values bounded by at least one operational phase transition condition. For example, the processor 104 may perform parameter segmentation on the sensor data 116 to generate data segments (e.g., one or more intervals).

In some implementations, the method 900 may include, after generating the operational phase transition indication, receiving an input identifying a modified operational phase transition condition and processing the data based on the modified operational phase transition condition to generate a modified operational phase transition indication. For example, the processor 104 may update a trigger condition or a look-ahead and evaluate the data based on the updated condition, as described with reference to FIG. 2. The processor 104 may then modify the output 142, generate a second output, or a combination thereof, based on the modified operational phase transition condition. In some implementations, the modified operational phase transition condition may include at least one of a modified first condition or a modified second condition.

In some implementations, the candidate operational phase transition may be identified further based on a time offset value indicating a minimum time between transitioning from the first operational phase and transitioning to the candidate operational phase. For example, the time offset value may include or correspond to the delay of FIG. 1. To illustrate, the time offset value (e.g., the delay) may be added to first time to identify the candidate operational phase transition, as described with reference to FIG. 1.

The method 900 may enable a user to analyze an operation of a vehicle, generate a graphical representation of the operation of the vehicle, and to adjust or update conditions for determining operational phases of the vehicle. The method 900 may be more accurate in determining operational phases of the vehicle as compared to systems that do not use look-ahead or look-behind conditions. The method 900 may be more efficient and use fewer processing resources as compared to systems that evaluate that data each time an operational phase is identified or a condition is adjusted and as compared to systems that do not use parameter segmentation.

Figure 10:
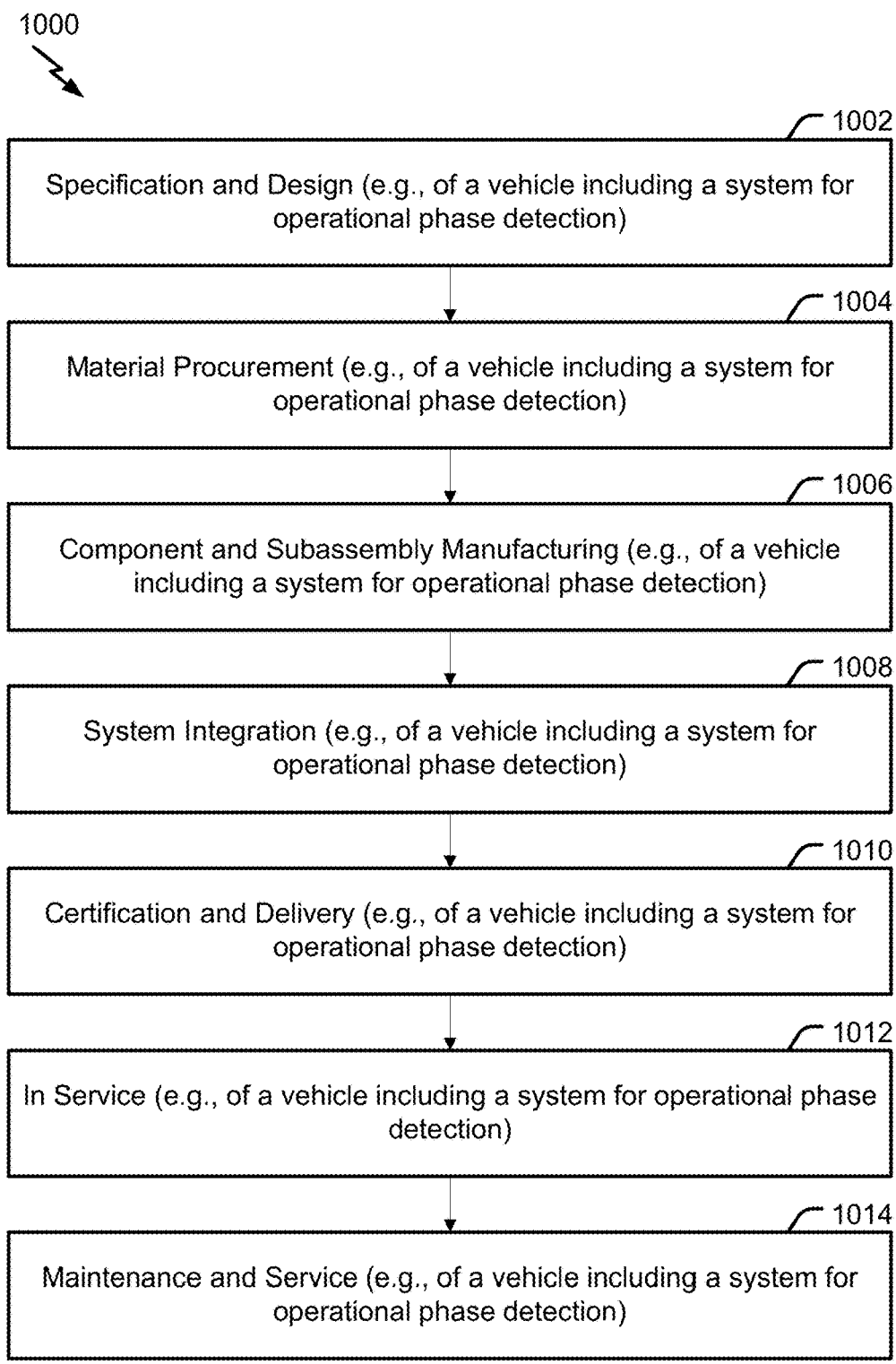
FIG. 10 is a flow chart of an example of a method of operating a system for operational phase detection.
Figure 11:
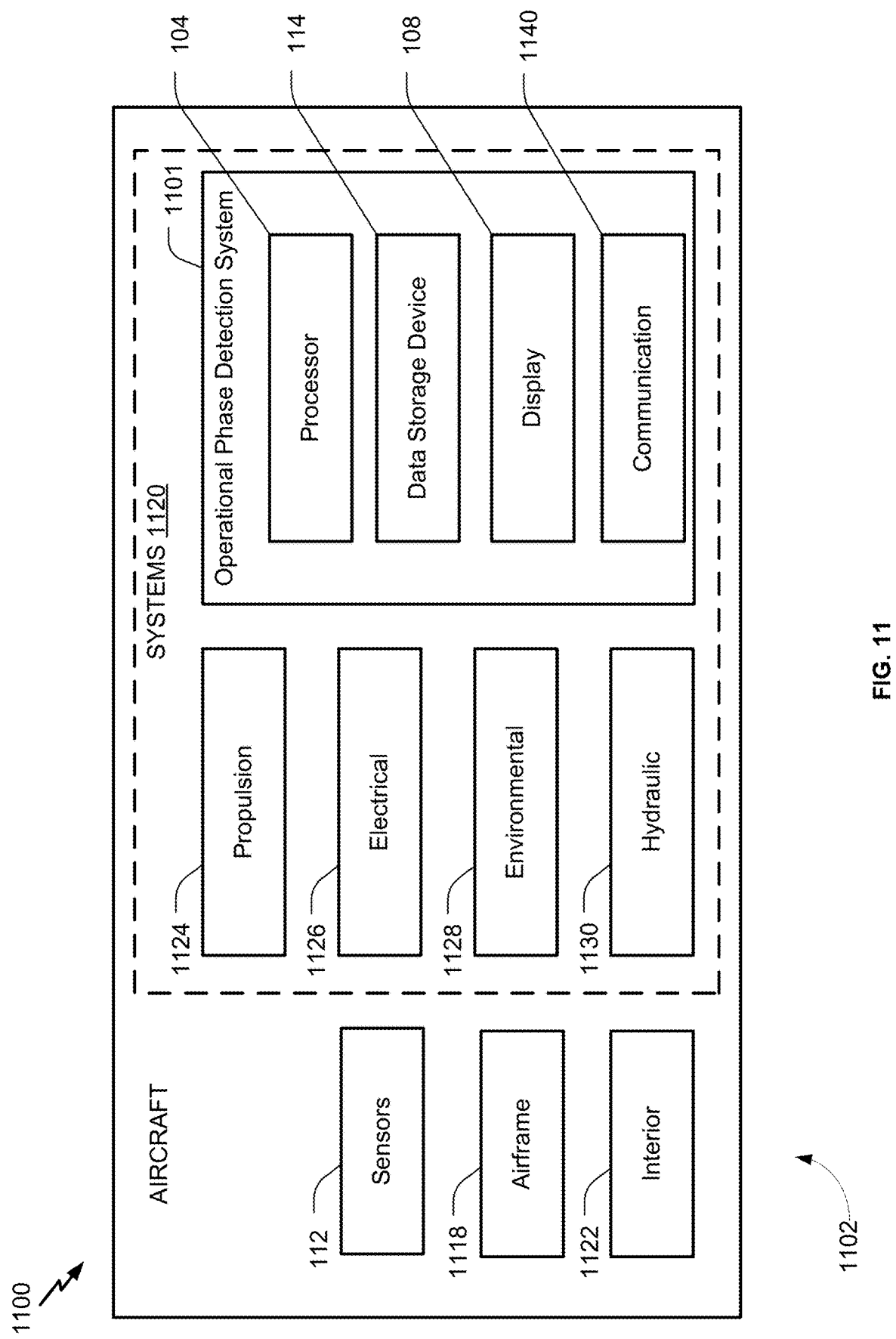
FIG. 11 is a block diagram of an illustrative implementation of a vehicle that includes an operational phase detection system.

Referring to FIGS. 10 and 11, examples of the disclosure are described in the context of a vehicle manufacturing and service method 1000 as illustrated by the flow chart of FIG. 10 and a vehicle system 1100 as illustrated by the block diagram of FIG. 11. A vehicle produced by the vehicle manufacturing and service method 1000 of FIG. 10 and a vehicle 1102 of FIG. 11 may include aircraft, an automobile, a train, a motorcycle, a bus, a ship or boat, a rocket, a spacecraft, an autonomous vehicle, or another vehicle, as illustrative, non-limiting examples.

Referring to FIG. 10, a flowchart of an illustrative example of a method of operating a system for operational phase detection is shown and designated 1000. During pre-production, the exemplary method 1000 includes, at 1002, specification and design of a vehicle, such as the vehicle 102 of FIG. 1 or a vehicle 1102 described with reference to FIG. 11. During the specification and design of the vehicle, the method 1000 may include specifying a plurality of sensors, a processor, a memory, a display, or a combination thereof. The plurality of sensors and the processor may include or correspond to the plurality of sensors 112 and the processor 104, respectively. The memory may include or correspond to the memory 106, the data storage device 114 of FIG. 1, or both. The display may include or correspond to the display 108 of FIG. 1. At 1004, the method 1000 includes material procurement. For example, the method 1000 may include procuring materials (such as the plurality of sensors 112 of FIG. 1, the processor 104 of FIG. 1, the memory 106 of FIG. 1, the display 108 of FIG. 1, or a combination thereof) for the operational phase detection system.

During production, the method 1000 includes, at 1006, component and subassembly manufacturing and, at 1008, system integration of the vehicle. The method 1000 may include component and subassembly manufacturing (e.g., producing the plurality of sensors 112 of FIG. 1, the processor 104 of FIG. 1, the memory 106 of FIG. 1, the display 108 of FIG. 1, or a combination thereof) of the flight management system and system integration (e.g., coupling the plurality of sensors 112 to the processor 104) of the system for operational phase detection. At 1010, the method 1000 includes certification and delivery of the vehicle and, at 1012, placing the vehicle in service. Certification and delivery may include certifying the system for operational phase detection. The method 1000 may include placing the system for operational phase detection in service. While in service by a customer, the vehicle may be scheduled for routine maintenance and service (which may also include modification, reconfiguration, refurbishment, and so on). At 1014, the method 1000 includes performing maintenance and service on the vehicle. The method 1000 may include performing maintenance and service of the system for operational phase detection. For example, maintenance and service of the system for operational phase detection may include replacing one or more of the plurality of sensors 112 of FIG. 1, the processor 104 of FIG. 1, the memory 106 of FIG. 1, the display 108 of FIG. 1, or a combination thereof. As another example, maintenance and service of the system may also include upgrading or adjusting detection conditions (e.g., the operational phase definitions 132, the phase transition rules 134, the trigger conditions 136, the look-ahead conditions 138 of FIG. 1, or a combination thereof.

Each of the processes of the method 1000 may be performed or carried out by a system integrator, a third party, and/or an operator (e.g., a customer). For the purposes of this description, a system integrator may include without limitation any number of vehicle manufacturers and major-system subcontractors; a third party may include without limitation any number of venders, subcontractors, and suppliers; and an operator may be an airline, leasing company, military entity, service organization, and so on.

Referring to FIG. 11, a block diagram of an illustrative implementation of a vehicle that includes components of a system for operational phase detection is shown and designated 1100. For example, the vehicle 1102 may include or correspond to the vehicle 102 of FIG. 1. To illustrate, the vehicle 1102 may include an aircraft, as an illustrative, non-limiting example. The vehicle may have been produced by at least a portion of the method 1000 of FIG. 10. As shown in FIG. 1, the vehicle 1102 (e.g., an aircraft) may include a plurality of sensors 112, an airframe 1118, an interior 1122, and a plurality of systems 1120 including an operational phase detection system 1101. The plurality of systems 1120 may additionally include one or more of a propulsion system 1124, an electrical system 1126, an environmental system 1128, or a hydraulic system 1130. The operational phase detection system 1101 may include components of the system 100 described with reference to FIG. 1, and may include the processor 104, the data storage device 114, the display 108 of FIG. 1, and a communication system 1140. Any number of other systems may be included, such as a memory (not shown) coupled to the processor. The memory may include or correspond to the memory 106 of FIG. 1. The processor may be configured to execute computer-executable instructions (e.g., a program of one or more instructions) stored in the data storage device 114 or the memory. The instructions may include or correspond to instructions 130 of FIG. 1, which when executed cause the processor to perform one or more operations of the methods of FIG. 9. Although an aerospace example is shown, the implementations described herein may be applied to other industries, such as the automotive industry, as an illustrative, non-limiting example.

Apparatus and methods included herein may be employed during any one or more of the stages of the method 1000 of FIG. 10. For example, components or subassemblies corresponding to production process 1008 may be fabricated or manufactured in a manner similar to components or subassemblies produced while the vehicle 1102 is in service, at 1012 for example and without limitation. Also, one or more apparatus implementations, method implementations, or a combination thereof may be utilized during the production stages (e.g., stages 1002-1010 of the method 1000), for example, by substantially expediting assembly of or reducing the cost of the vehicle 1102. Similarly, one or more of apparatus implementations, method implementations, or a combination thereof may be utilized while the vehicle 1102 is in service, at 1012 for example and without limitation, to maintenance and service, at 1014.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method for monitoring aircraft operation using operational data acquired during operation of an aircraft, the method comprising:
   obtaining, at a processor, data associated with operation of the aircraft from one or more sensors;
   segmenting, by the processor, the data from the one or more sensors into segment intervals for a number of parameters associated with particular sensor data from the one or more sensors according to a set of operational phase transition conditions associated with the aircraft;
   identifying, by the processor, a plurality of operational phase transitions associated with operation of the aircraft, wherein identifying an operational phase transition of the plurality of operational phase transitions includes:
      determining, by the processor, a first operational phase of the aircraft at a first time;
      analyzing the data in the segment intervals subsequent to the first time to identify a candidate operational phase transition based on satisfaction of a first trigger condition corresponding to a first parameter associated with a threshold;
      after identifying the candidate operational phase transition, analyzing the data in the segment intervals subsequent to the first time for satisfaction of a second trigger condition corresponding to a second parameter associated with a value; and
      in response to confirming the candidate operational phase transition to a candidate operational phase based on the first trigger condition and the second trigger condition being satisfied, generating, by the processor, an operational phase transition indication that indicates occurrence of the operational phase transition to the candidate operational phase; and
   displaying, on a user interface display of the aircraft, a chronological ordering of multiple operational phases associated with actual operation of the aircraft based on the plurality of operational phase transitions.

2. The method of claim 1, wherein the data includes sensor data from a speed sensor, a landing gear position indicator, a fuel flow rate sensor, an altitude sensor, or a combination thereof, wherein the segmenting includes at least segmenting speed sensor data into first segment intervals according to a speed parameter, and wherein trigger conditions associated with the first segment intervals include at least a first condition of the speed parameter being greater than a first speed threshold and a second condition of the speed parameter being greater than a second speed threshold.

3. The method of claim 1, wherein the first trigger condition is satisfied based on data from a first sensor, and wherein the second trigger condition is satisfied based on second data from a second sensor distinct from the first sensor.

4. The method of claim 1, wherein the parameters include ground speed determined from first sensor data from a ground speed sensor.

5. The method of claim 4, wherein the parameters further include altitude determined from second sensor data from an altitude sensor.

6. The method of claim 4, wherein, for identifying a particular operational phase transition, the first parameter corresponds to the ground speed, wherein the first trigger condition corresponds to exceeding a maximum taxi ground speed indicated by the threshold, wherein the candidate operational phase transition comprises a take-off roll phase, wherein the second parameter corresponds to landing gear position, and wherein the value indicates the landing gear position is down.

7. The method of claim 5, wherein, for identifying a second particular operation phase transition, the first parameter corresponds to the ground speed, wherein the first trigger condition corresponds to exceeding a take-off roll phase speed, wherein the candidate operation phase transition comprises an initial climb phase, wherein the second parameter corresponds to altitude, and wherein the value indicates a value above ground level.

8. The method of claim 1, wherein, for identifying a second particular operation phase transition, the first trigger condition is associated with detection of a decrease in altitude, and wherein satisfaction of the second trigger condition includes detection of the decrease in altitude for at least a threshold time.

9. The method of claim 1, wherein the data includes state data that indicates a state of a system of the aircraft.

10. The method of claim 1, further comprising:
receiving an updated trigger condition;
adjusting one or more segment intervals of the segment intervals based on the updated trigger condition; and
generating an updated operational phase transition indication based on the adjusting the one or more segment intervals.

11. The method of claim 10, further comprising:
receiving a second updated trigger condition;
readjusting one or more segment intervals associated with the updated trigger condition based on the second updated trigger condition; and
generating a second updated operational phase transition indication based on the readjusting the one or more segment intervals.

12. The method of claim 1, further comprising, after generating the operational phase transition indication:
receiving an input identifying a modified operational phase transition condition; and
processing the data based on the modified operational phase transition condition to generate a modified operational phase transition indication.

13. The method of claim 12, wherein the modified operational phase transition condition includes at least one of a modified trigger condition or a modified second condition.

14. The method of claim 1, wherein the operational phase transition is identified further based on a time offset value indicating a minimum time between transitioning from the first operational phase and transitioning to the candidate operational phase.

15. The method of claim 1, wherein analyzing the data in the segment intervals comprises identifying a transition to a first candidate operational phase of a taxi out phase based on satisfaction of the first trigger condition corresponding to a ground speed greater than 10 knots and based on satisfaction of the second trigger condition corresponding to the value indicating landing gear position is down, and wherein identifying a second candidate operational phase transition comprises identifying a transition from the first candidate operational phase to a second candidate operational phase of a take-off roll phase based on satisfaction of the first trigger condition corresponding to a ground speed greater than 50 knots associated with a take-off roll phase and based on satisfaction of the second trigger condition corresponding to the value indicating an altitude increase corresponding to a climb phase.

16. The method of claim 15, wherein the operational phase transition indication includes a graphical representation of a set of operational phase transitions identified in the data, and the user interface display further includes time-stamped data values associated with detection of each operational phase transition of the set of operational phase transitions.

17. An aircraft comprising:
a plurality of sensors configured to generate sensor data during operation of the aircraft;
a processor configured to:
receive the sensor data from one or more sensors;
segment the sensor data from one or more sensors into segment intervals for a number of parameters associated with particular sensor data from the one or more sensors according to a set of operational phase transition conditions;
identify a plurality of operational phase transitions associated with aircraft operation, wherein identifying an operational phase transition of the plurality of operational phase transitions includes:
determine a first operational phase of the aircraft at a first time;
analyze the sensor data in the segment intervals to identify a candidate operational phase transition from the first operational phase to a candidate operational phase based on satisfaction of a first trigger condition corresponding to a first parameter associated with a threshold;
after identifying the candidate operational phase, analyze the data in the segment intervals for satisfaction of a second trigger condition corresponding to a second parameter associated with a value at a time subsequent to the first time; and
in response to confirming the candidate operational phase transition to a candidate operation phase based on a determination that the first trigger condition and the second trigger condition are satisfied, generate an operational phase transition output that indicates an occurrence of an operational phase transition at the first time; and
a display device configured to display a user interface display including a chronological ordering of multiple operational phases associated with actual aircraft operation based on the plurality of operational phase transitions.

18. The aircraft of claim 17, wherein the sensor data further includes state data that indicates a state of a system of the aircraft.

19. A non-transitory computer-readable medium storing instructions that, when executed by a processor, cause the processor to perform operations comprising:
obtaining data associated with operation of an aircraft from one or more sensors;
segmenting the data from one or more sensors into segment intervals for a number of parameters associated with particular sensor data from the one or more sensors according to a set of operational phase transition conditions associated with the aircraft;
identifying a plurality of operational phase transitions associated with operation of the aircraft, wherein identifying an operational phase transition of the plurality of operational phase transitions includes:

determining a first operational phase of the aircraft at a first time;

analyzing the data in the segment intervals to identify a candidate operational phase transition from the first operational phase based on satisfaction of a first trigger condition corresponding to a first parameter associated with a threshold;

after identifying the candidate operational phase transition, analyzing the data in the segment intervals for satisfaction of a second trigger condition corresponding to a second parameter associated with a value at a time subsequent to the first time; and based on a determination that the first trigger condition and second trigger condition are satisfied, generating an operational phase transition indication that indicates an occurrence of the operational phase transition at the first time; and displaying, on a user interface display of the aircraft, a chronological ordering of multiple operational phases associated with actual operation of the aircraft based on the plurality of operational phase transitions.

20. The non-transitory computer-readable medium of claim 19, wherein satisfaction of the first trigger condition includes a first parameter determined from first data associated with a first sensor satisfying a first threshold and satisfaction of the second trigger condition includes a second parameter determined from second data associated with a second sensor satisfying a second threshold.

* * * * *